(12) United States Patent
Kobayashi et al.

(10) Patent No.: US 9,990,657 B2
(45) Date of Patent: Jun. 5, 2018

(54) INFORMATION DISPLAY DEVICE, DISTRIBUTION DEVICE, INFORMATION DISPLAY METHOD, AND NON-TRANSITORY COMPUTER READABLE STORAGE MEDIUM

(71) Applicant: YAHOO JAPAN CORPORATION, Tokyo (JP)

(72) Inventors: Daisuke Kobayashi, Tokyo (JP); Tatsuaki Suzuki, Tokyo (JP); Kensuke Takada, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 0 days. days.

(21) Appl. No.: 14/800,566

(22) Filed: Jul. 15, 2015

(65) Prior Publication Data
US 2016/0019604 A1 Jan. 21, 2016

(30) Foreign Application Priority Data

Jul. 18, 2014 (JP) ................................ 2014-148240

(51) Int. Cl.
G06Q 30/02 (2012.01)
G06F 3/0485 (2013.01)
(Continued)

(52) U.S. Cl.
CPC ....... G06Q 30/0277 (2013.01); G06F 3/0416 (2013.01); G06F 3/0481 (2013.01); G06F 3/0485 (2013.01); G06F 3/0488 (2013.01); G06Q 30/02 (2013.01); G06Q 30/0267 (2013.01); G06T 11/60 (2013.01);
(Continued)

(58) Field of Classification Search
CPC ...................... G06Q 30/0277; G06Q 30/0267
See application file for complete search history.

(56) References Cited

U.S. PATENT DOCUMENTS 4,954,818 A * 9/1990 Nakane .................... G09G 5/14
                                                    345/536
5,440,680 A * 8/1995 Ichikawa ................. G09G 5/14
                                                    345/536
(Continued)

FOREIGN PATENT DOCUMENTS

JP   2003-022042 A   1/2003
JP   2010-526494 A   7/2010
(Continued)

OTHER PUBLICATIONS

Feb. 9, 2016 Office Action issued in Japanese Patent Application No. 2014-148240.
(Continued)

*Primary Examiner* — Luis A Brown
*Assistant Examiner* — Radu Andrei
(74) *Attorney, Agent, or Firm* — Oliff PLC

(57) ABSTRACT

According to one aspect of an embodiment, an information display device includes a display unit configured to display first content and second content in a display region so as to overlap each other. The information display device includes a change unit configured to change the second content to third content, depending on a position where a predetermined region included in the first content is displayed.

11 Claims, 8 Drawing Sheets

(51) Int. Cl.
  *H04L 29/06*     (2006.01)
  *G06F 3/041*     (2006.01)
  *H04M 1/725*     (2006.01)
  *G09G 5/14*      (2006.01)
  *H04N 5/445*     (2011.01)
  *G06F 3/0481*    (2013.01)
  *G06T 11/60*     (2006.01)
  *G06F 3/0488*    (2013.01)

(52) U.S. Cl.
  CPC .......... *G09G 5/14* (2013.01); *H04L 65/403* (2013.01); *H04M 1/72519* (2013.01); *H04N 5/44543* (2013.01)

(56) References Cited

U.S. PATENT DOCUMENTS

| | | | | |
|---|---|---|---|---|
| 6,169,538 B1* | 1/2001 | Nowlan | G06F 3/0488 | 341/22 |
| 6,456,194 B1* | 9/2002 | Carlson | B60G 17/0165 | 340/440 |
| 6,493,008 B1* | 12/2002 | Yui | G09G 5/08 | 348/E5.104 |
| 6,600,500 B1* | 7/2003 | Yamamoto | G06F 3/0481 | 715/779 |
| 7,956,869 B1* | 6/2011 | Gilra | G06F 3/0481 | 345/157 |
| 2002/0067433 A1* | 6/2002 | Yui | G09G 5/14 | 348/588 |
| 2006/0055710 A1* | 3/2006 | Lo | G09G 5/14 | 345/629 |
| 2006/0112354 A1* | 5/2006 | Park | G06F 3/0481 | 715/835 |
| 2007/0247440 A1* | 10/2007 | Shin | G06F 3/04883 | 345/173 |
| 2008/0204424 A1* | 8/2008 | Jin | G06F 3/0482 | 345/173 |
| 2008/0276272 A1* | 11/2008 | Rajaraman | G06Q 30/02 | 725/37 |
| 2009/0144574 A1* | 6/2009 | Tseng | G06F 1/1616 | 713/323 |
| 2010/0026894 A1* | 2/2010 | Osawa | H04N 5/44591 | 348/564 |
| 2010/0077431 A1* | 3/2010 | Neufeld | G06F 3/0488 | 725/39 |
| 2010/0122214 A1* | 5/2010 | Sengoku | G06F 3/0485 | 715/830 |
| 2010/0231752 A1* | 9/2010 | Lodge | G09B 21/001 | 348/231.4 |
| 2010/0263946 A1* | 10/2010 | Miyazaki | G06F 3/04883 | 178/2 R |
| 2011/0258053 A1* | 10/2011 | Lee | G06Q 30/02 | 705/14.69 |
| 2012/0056902 A1* | 3/2012 | Yoshino | G09G 3/20 | 345/660 |
| 2012/0174028 A1* | 7/2012 | Sirpal | G06F 1/1616 | 715/790 |
| 2013/0027719 A1* | 1/2013 | Tsuji | H04N 1/00424 | 358/1.9 |
| 2013/0038623 A1* | 2/2013 | Tezuka | G06F 3/04886 | 345/589 |
| 2013/0057577 A1* | 3/2013 | Jeong | H04N 13/04 | 345/629 |
| 2013/0100162 A1* | 4/2013 | Iseri | G09G 5/14 | 345/629 |
| 2013/0155185 A1* | 6/2013 | Nishida | G09G 5/14 | 348/43 |
| 2014/0036149 A1* | 2/2014 | Ogawa | H04N 5/44591 | 348/468 |
| 2014/0237428 A1* | 8/2014 | Miyazaki | G06F 3/0488 | 715/833 |
| 2014/0292760 A1* | 10/2014 | Shikolay | G06F 3/0485 | 345/428 |
| 2015/0058792 A1* | 2/2015 | Gelernter | G06F 3/0485 | 715/784 |
| 2015/0121270 A1* | 4/2015 | Wang | G06F 3/0481 | 715/768 |
| 2015/0121300 A1* | 4/2015 | Wang | G06F 3/04845 | 715/790 |
| 2015/0181200 A1* | 6/2015 | Arrasvuori | G06K 9/00 | 348/46 |
| 2015/0317286 A1* | 11/2015 | Wang | G06F 9/4443 | 715/788 |
| 2015/0348495 A1* | 12/2015 | Kim | G06F 3/0484 | 345/156 |
| 2015/0363084 A1* | 12/2015 | Spjuth | G06T 11/60 | 715/716 |

FOREIGN PATENT DOCUMENTS

JP      2011-128204 A       6/2011
WO      2008/137482 A1      11/2008

OTHER PUBLICATIONS

Amanda Connelly et al., NASA: Prospect (Jan. 28, 2013), http://web.archive.org/web/20130128093230/http://nasaprospect.com/ (last visited Feb. 2, 2016).

Jun. 14, 2016 Office Action issued in Japanese Patent Application No. 2014-148240.

Nov. 8, 2016 Office Action issued in Japanese Patent Application No. 2014-148240.

* cited by examiner

| ADVERTISER ID | ADVERTISING CONTENT | BIDDING PRICE | CTR |
|---|---|---|---|
| B10 | C11, C12, C13 DISPLAY INSTRUCTION | 100 | 0.02 |
| | C14 | 50 | 0.01 |
| | C15 | 150 | 0.02 |
| | ... | ... | ... |
| B20 | C21 | 100 | 0.01 |
| | C22 | 50 | 0.02 |
| | ... | ... | ... |
| ... | ... | ... | ... |

INFORMATION DISPLAY DEVICE, DISTRIBUTION DEVICE, INFORMATION DISPLAY METHOD, AND NON-TRANSITORY COMPUTER READABLE STORAGE MEDIUM

CROSS-REFERENCE TO RELATED APPLICATIONS

The present application claims priority to and incorporates by reference the entire contents of Japanese Patent Application No. 2014-148240 filed in Japan on Jul. 18, 2014.

BACKGROUND OF THE INVENTION

1. Field of the Invention

The present invention relates to an information display device, a distribution device, an information display method, and a non-transitory computer readable storage medium having an information displaying program.

2. Description of the Related Art

In recent years, information has been actively distributed through the Internet. For example, a technique has been known which arranges and displays advertising content, such as a still image, a moving image, or text related to companies or products, at a predetermined position of a web page. In addition, as a technique related to information distribution, a technique has been proposed which displays information content, such as a moving image or a web page, on a first layer and displays advertising content on a second layer that is displayed so as to overlap the first layer. Furthermore, a technique has been proposed which displays information content on a first layer and displays advertising content on a second layer behind the information content.

However, in the techniques according to the related art, in some cases, it is difficult to improve the effectiveness of advertising of content. For example, in the related art, information content and advertising content are merely displayed so as to overlap each other. Therefore, it is difficult for the user to view the advertising content and there is a concern that the desired effectiveness of advertising will not be obtained.

SUMMARY OF THE INVENTION

It is an object of the present invention to at least partially solve the problems in the conventional technology.

According to one aspect of an embodiment, an information display device includes a display unit configured to display first content and second content in a display region so as to overlap each other. The information display device includes a change unit configured to change the second content to third content, depending on a position where a predetermined region included in the first content is displayed.

According to the other aspect of an embodiment, a distribution device includes a distribution unit configured to distribute control information for controlling a display aspect second content which is displayed together with first content to an information display device. The control information causes the information display device to perform a display process of displaying the first content and the second content in a display region so as to overlap each other and a change process of changing the second content to third content, depending on a position of the display region where a predetermined region included in the first content is displayed.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
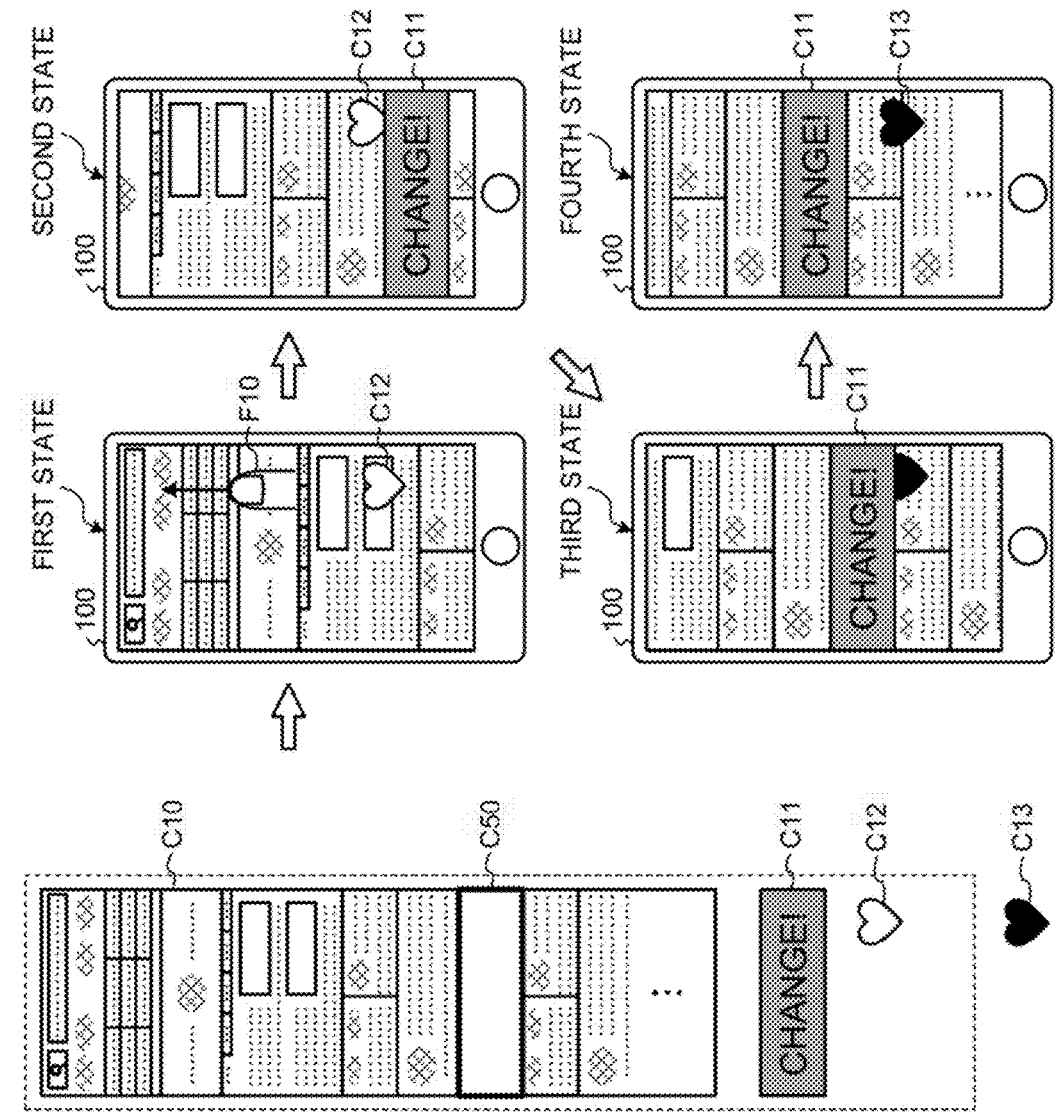
FIG. 1 is a diagram illustrating an example of a terminal device according to an embodiment.

Hereinafter, modes (hereinafter, referred to as "embodiments") for carrying out an information display device, a distribution device, an information display method, and a non-transitory computer readable storage medium having an information display program stored therein according to the invention will be described in detail with reference to the drawings. The information display device, the distribution device, the information display method, and the non-transitory computer readable storage medium having the information display program stored therein according to the invention are not limited by the embodiments. In the following embodiments, the same components are denoted by the same reference numerals and the description thereof will not be repeated.

1. Display Process

First, an example of the process of a terminal device 100, which is an example of the information display device, will be described with reference to FIG. 1. FIG. 1 is a diagram illustrating an example of the terminal device according to an embodiment. FIG. 1 illustrates an example in which the terminal device 100 displays a web page C10 and a plurality of advertising content items C11 to C13.

The terminal device 100 illustrated in FIG. 1 is a smart device, such as a smart phone or a tablet, and is a mobile terminal device that can communicate with an arbitrary server device through a wireless communication network, such as a third-generation (3G) network or a long term evolution (LTE) network. The terminal device 100 includes an output unit 130 such as a liquid crystal display. It is assumed that a touch panel is used as the terminal device 100. That is, the user of the terminal device 100 touches a display surface of the output unit 130 (hereinafter, referred to as a screen in some cases) with a finger or a dedicated pen to perform various operations.

The web page C10 is, for example, a web page in which news, a weather forecast, the index or content of received mail, a photo viewer, and various other kinds of content are arranged and which is described by a hyper text markup language (HTML) or an extensible markup language (XML). The web page C10 includes, for example, an input field for inputting a search keyword and links to other web pages. In the following description, it is assumed that the web page C10 is a web page of a so-called portal site. In addition, it is assumed that the web page C10 is a web page which is optimized for smart devices and has a display size in the horizontal direction that is equal to the display size of the screen of the terminal device 100 in the horizontal direction. Furthermore, it is assumed that the web page C10 has a display size in the vertical direction that is larger than the display size of a display of the terminal device 100 in the vertical direction.

The web page C10 may include content items which are independently arranged in a tile shape. For example, an operation or update may be performed for each of the content items which are arranged in the tile shape. The size or position of each of the tiles arranged in the web page C10 may be automatically changed for each tile or may be changed by the operation of the user.

For example, each news topic is displayed as items of the "latest news" or a "news list" in the web page C10. The news topic corresponds to an anchor text having links to other web pages. In addition, text or buttons, such as "route", "auction", and "shopping", in which links to web pages for providing various services are set are arranged in the web page C10. In the example illustrated in FIG. 1, the web page C10 includes an advertisement region C50 in which the advertising content item C11 is arranged.

The advertising content item C11 is, for example, a still image or a moving image which is a portion of an advertisement and is provided by an advertiser. In the example illustrated in FIG. 1, the advertising content item C11 is an image which has the same display size as the screen of the terminal device 100 in the horizontal direction and is a banner advertisement in which, for example, an advertising copy "Change!" is arranged. In addition, the advertising content item C11 may include, for example, the image of an object to be advertised, an advertising copy, and a company logo.

The advertising content item C12 is a heart-shaped image and is a heart-shaped white icon with a black outline. It is assumed that the display size of the advertising content item C12 in the vertical direction is equal to or less than the display size of the advertising content item C11 in the vertical direction. The advertising content items C11 and C12 illustrated in FIG. 1 are illustrative examples. For example, other banner advertisements or icons can be applied.

Similarly to the advertising content item C12, the advertising content item C13 is a heart-shaped image and is a heart-shaped black ion with a black outline. That is, the advertising content item C13 is an icon that has the same shape as the advertising content item C12 and has a different color from the advertising content item C12. The advertising content item C13 may be generated from the advertising content item C12 by the terminal device 100 or may be distributed from an advertisement distribution server 20 which distributes the advertising content items C11 and C12, similarly to the advertising content, items C11 and C12.

A link to a predetermined web page (so-called landing page) is set in the advertising content item C11. When the operation of the user satisfies predetermined conditions, the terminal device 100 displays the landing page set in the advertising content item C11. For example, when the user selects a region in which the advertising content item C11 is displayed in the screen of the terminal device 100, the terminal device 100 displays the landing page corresponding to the advertising content item C11. When the user selects a region in which the advertising content item C12 is displayed in the screen of the terminal device 100, the terminal device 100 can display the same landing page as that when the advertising content item C11 is selected or may display a different landing page.

2. Process Performed by Terminal Device 100

Here, the terminal device 100 performs the following process in order to make the user interested in an advertisement. First, when receiving the web page C10 and the advertising content items C11 and C12, the terminal device 100 arranges the web page C10, the advertising content item C11, and the advertising content item C12 so as to overlap each other. Specifically, the terminal device 100 arranges and displays the web page C10, the advertising content item C11, and the advertising content item C12 on different layers. For example, the terminal device 100 arranges and displays the advertising content item C12 at a predetermined position on the screen, and arranges and displays the web page C10 behind the advertising content item C12. In addition, the terminal device 100 arranges the advertising content item C11 at the same position as the advertisement region C50 of the web page C10 on a layer (that is, a user-side layer) in front of the advertising content item C12.

The terminal device 100 performs a scroll operation for the web page C10 and the advertising content item C11 in response to the operation of the user. For example, when the user touches the screen with a finger and moves the finger in the upper direction, that is, when a scroll operation is performed in the upper direction, the terminal device 100 scrolls the web page C10 and the advertising content item C11 in the upper direction. When the user touches the screen with a finger and moves the finger in the lower direction, that is, when a scroll operation is performed in the lower direction, the terminal device 100 scrolls the web page C10 and the advertising content item C11 in the lower direction. That is, the terminal device 100 reflects the scroll operation of the user in the web page C10 and the advertising content item C11 and performs display such that the advertising content item C11 seems to be arranged in the display region of the web page C10.

In contrast, the terminal device 100 does not move the advertising content item C12 and displays the advertising content item C12 at a predetermined position, in response to the scroll operation of the user. As a result, when the position where the advertisement region C50 is displayed and the position where the advertising content item C12 is displayed are overlapped by the scroll operation of the user, the terminal device 100 displays the advertising content items C11 and C12 such that the advertising content item C12 is hidden by the advertising content item C11.

The hidden state means that the layer on which the advertising content item C12 is arranged is arranged behind the layer on which the advertising content item C11 is arranged and the region in which the advertising content item C11 is displayed is moved such that the region in which the advertising content item C11 is displayed overlaps the region in which the advertising content item C12 is displayed. That is, the hidden state means that the advertising content item C12 and the advertising content item C11 overlap each other and a portion of or the entire advertising content item C12 is invisible. For example, the terminal device 100 can determine that the advertising content item C12 is hidden behind the advertising content item C11 when a region which accounts for a predetermined proportion of the region in which the advertising content item C12 is displayed overlaps the region in which the advertising content item C11 is displayed.

Then, the terminal device 100 performs the following display change process. First, the terminal device 100 changes the advertising content item C12, which is second content, to the advertising content item C13, which is third content, depending on the display position of the advertisement region C50 included in the web page C10, which is first content, on the screen.

2-1. Advertisement Change Process

For example, the terminal device 100 displays the web page C10 which is the first content. In addition, the terminal device 100 arranges the advertising content item C12, which is the second content, on a layer in front of the web page C10. The terminal device 100 arranges the advertising content item C11, which is fourth content, at the same position as the advertisement region C50 of the web page C10 on a layer in front of the layer on which the advertising content item C12 is arranged.

Then, the terminal device 100 scrolls the web page C10 and the advertising content item C11 in response to the scroll operation of the user. At that time, the terminal device 100 specifies the position where the advertisement region C50 is displayed on the screen. Then, when the advertisement region C50 is located above a predetermined position where the advertising content item C12 is displayed on the screen, the terminal device 100 changes the advertising content item C12 to the advertising content item C13.

For example, the terminal device 100 generates an image in which the inside of the advertising content item C12 is colored black, that is, the advertising content item C13 which is an icon that has the same shape as the advertising content item C12 and has a different color from the advertising content item C12 and displays the generated advertising content item C13 on the same layer as the advertising content item C12. This process may be implemented by a program, such as a Java (registered trademark) script, which is distributed together with the web page C10 or the advertising content items C11 and C12.

When the advertisement region C50 is located below the predetermined position where the advertising content item C12 is displayed on the screen, the terminal device 100 changes the advertising content item C13 to the advertising content item C12. That is, the terminal device 100 switches the advertising content item C12 and the advertising content item C13, on the basis of whether the advertisement region C50 is located above or below the predetermined position where the advertising content item C12 is displayed.

The terminal device 100 may receive the advertising content item C13 distributed from the advertisement distribution server 20, similarly to the advertising content items C11 and C12. In addition, the terminal device 100 may not display the advertising content item C13 on the same layer as the advertising content item C12, but may display the advertising content item C13 on a layer that is provided between the layer on which the advertising content item C11 is arranged and the layer on which the web page C10 is displayed and has the advertising content item C12 arranged thereon.

2-2. Example of Display by Advertisement Change Process

Next, an example of the screen displayed when the terminal device 100 performs the advertisement change process will be described with reference to FIG. 1. In the following description, an example of the advertisement change process which is performed by the terminal device 100 in response to the operation of the user is divided into first to fourth states.

First, the terminal device 100 receives the web page C10 and the advertising content items C11 and C12. In this case, the terminal device 100 displays the web page C10 on the entire screen. In addition, the terminal device 100 arranges the advertising content item C12 at a predetermined position of the screen on the layer in front of the web page C10. The terminal device 100 arranges the advertising content item C11 at a position where the advertisement region C50 is displayed on the layer in front of the advertising content item C12. Therefore, in the first state illustrated in FIG. 1, since the advertisement region C50 is located outside the screen, the terminal device 100 displays the web page C10 and the advertising content item C12 so as to overlap each other.

Here, when receiving the scroll operation of the user scrolling the web page C10 in the upper direction with a finger F10, the terminal device 100 scrolls the web page C10 and the advertising content item C11 in the upper direction. That is, the terminal device 100 moves the display position of the advertising content item C11 such that the advertising content item C11 overlaps the advertisement region C50 of the web page C10.

Here, the advertising content item C11 is arranged on the layer which is in front of the advertising content item C12. As a result, when the display positions of the advertising content item C11 and the advertising content item C12 are overlapped by the scroll operation, the terminal device 100 displays the advertising content items C11 and C12 such that the advertising content item C12 is hidden behind the advertising content item C11 from the upper side of the advertising content item C11, as illustrated in the second state in FIG. 1.

When the scroll operation is performed in the upper direction and the position where the advertisement region C50 is displayed is aligned with the position where the advertising content item C12 is displayed, the terminal device 100 displays the advertising content item C11 such that the advertising content item C12 is completely hidden behind the advertising content item C11. At that time, the terminal device 100 changes the advertising content item C12 to the advertising content item C13. That is, when a region which accounts for a predetermined proportion of the region in which the advertising content item C12 is displayed overlaps the region in which the advertising content item C11 is displayed by the movement of the advertising content item C11, the terminal device 100 changes the advertising content item C12 to the advertising content item C13.

As a result, when the scroll operation is further performed in the upper direction, the terminal device 100 displays the advertising content items C11 and the C13 such that the advertising content item C13 emerges from the lower side of the advertising content item C11, as illustrated in the third state in FIG. 1. Then, when the scroll operation is further performed in the upper direction, the terminal device 100 displays the advertising content items C11 and the C13 such that the advertising content item C13 completely emerges from the rear surface of the advertising content item C11, as illustrated in the fourth state in FIG. 1.

When the scroll operation is performed in the lower direction, the terminal device 100 displays the advertising content items C11 and C13 such that the advertising content item C13 is hidden behind the advertising content item C11 from the upper side of the advertising content item C11, as illustrated in the third state or the fourth state in FIG. 1. Then, when the position where the advertisement region C50 is displayed and the position where the advertising content item C13 is displayed are aligned with each other, the terminal device 100 displays the advertising content item C11 such that the advertising content item C13 is completely hidden behind the advertising content item C11. At that time, the terminal device 100 changes the advertising content item C13 to the advertising content item C12. Then, when the scroll operation is further performed in the lower direction, the terminal device 100 displays the advertising content items C11 and C12 such that the hidden advertising content item C12 emerges from the upper side of the advertising content item C11.

The above-mentioned change display process is implemented by, for example, the following processing. For example, the terminal device 100 arranges the center of the advertising content item C12 at predetermined coordinates in the display region of the screen. When the center of the advertisement region C50 is arranged below the predetermined coordinates on the screen, the terminal device 100 displays the advertising content item C12. When the center of the advertisement region C50 is arranged above the predetermined coordinates on the screen, the terminal device 100 changes the advertising content item C12 to the advertising content item C13.

For example, it is assumed that, in the terminal device 100, the upper left corner of the screen is the origin, the horizontal direction of the screen is the X-axis, and the vertical direction of the screen is the Y-axis. When the value of a Y-axis component of the coordinates of the center of the advertisement region C50 is less than the value of a Y-axis component of the predetermined coordinates, the terminal device 100 displays the advertising content item C12. When the value of the Y-axis component of the coordinates of the center of the advertisement region C50 is greater than the value of the Y-axis component of the predetermined coordinates, the terminal device 100 displays the advertising content item C13.

As such, the terminal device 100 displays the web page C10, which is the first content, and the advertising content item C12, which is the second content, so as to overlap each other. Then, the terminal device 100 changes the advertising content item C12 to the advertising content item C13, which is the third content, depending on the position where the advertisement region C50 included in the web page C10 is displayed on the screen. As a result, the terminal device 100 changes the advertising content item C12 to the advertising content item C13, depending on the scroll operation of the user. Therefore, the terminal device 100 makes the user aware of an advertisement. As a result, it is possible to make the user interested in the advertisement and to improve the effectiveness of advertising.

In the above-mentioned example, the terminal device 100 displays the advertising content item C13 obtained by changing the color of the advertising content item C12, which is the second content, as the third content. However, the embodiment is not limited thereto. The terminal device 100 may display, as the third content, content which is obtained by changing an arbitrary display mode, such as the color or shape of the advertising content item C12. For example, the terminal device 100 may arrange a colored layer in front of the second content and display, as the third content, content obtained by giving the color of the layer to the second content, according to the position of the advertisement region C50. In addition, the terminal device 100 may display, as the third content, new content that is different from the advertising content item C12, which is the second content, in color and shape.

As such, the terminal device 100 can display, as the third content, content different from the second content, such as content obtained by changing the second content, content obtained by giving an operation for another layer to the second content, or new content. That is, the terminal device 100 can display any content as the third content as long as the user can recognize the change of the second content to the third content. The terminal device 100 can perform the advertisement change process to make user aware of an advertisement. As a result, it is possible to make the user interested in the advertisement and to improve the effectiveness of advertising.

2-3. For Execution Subject

The terminal device 100 can achieve the above-mentioned process using an arbitrary method, which has not been described above. For example, the terminal device 100 may download in advance an application which causes the terminal device 100 to perform the display of the web page C10 and the above-mentioned advertisement change process and execute the application at any time to perform the above-mentioned process. In addition, the terminal device 100 may receive distributed control information for performing the advertisement change process at the same time as the web page C10 or the advertising content items C11 to C13 are distributed. Then, the terminal device 100 performs the advertisement change process on the basis of the control information. Next, for example, the terminal device 100 which performs the advertisement change process on the basis of the control information will be described. Further, in the following description, an example of a process in which the advertising content item C13 is distributed together with the advertising content items C11 and C12 is described.

3. Structure of Advertisement Distribution System

Figure 2:
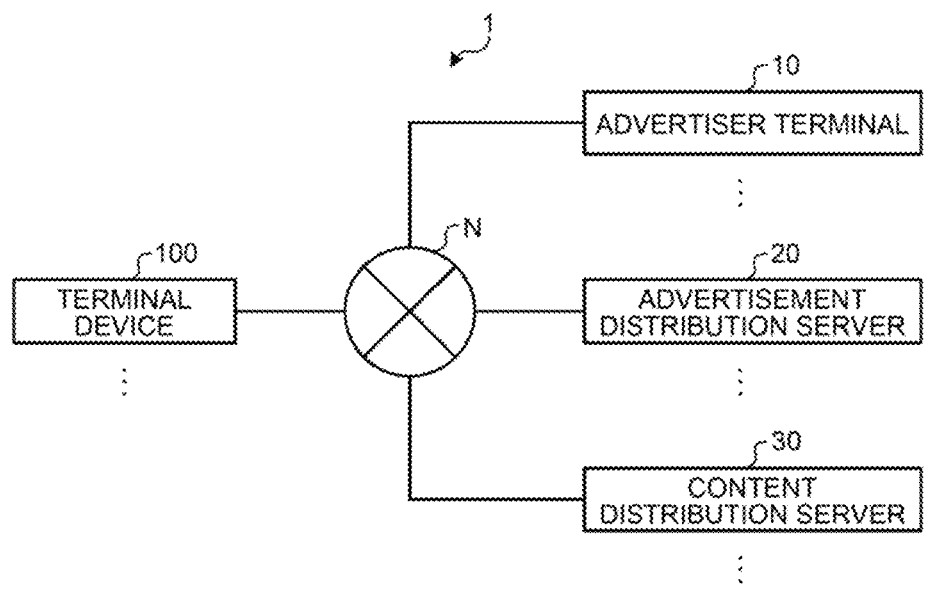
FIG. 2 is a diagram illustrating an example of the structure of an advertisement distribution system according to the embodiment.

Next, for example, the terminal device 100 which achieves the above-mentioned display process will be described. First, the structure of an advertisement distribution system 1 according to the embodiment will be described with reference to FIG. 2. FIG. 2 is a diagram illustrating an example of the structure of the advertisement distribution system according to the embodiment. As illustrated in FIG. 2, the advertisement distribution system 1 includes the terminal device 100, an advertiser terminal 10, the advertisement distribution server 20, and a content distribution server 30. The terminal device 100, the advertiser terminal 10, the advertisement distribution server 20, and the content distribution server 30 are connected through a network N such that they can communicate with each other wirelessly or in a wired manner. The advertisement distribution system 1 illustrated in FIG. 2 may include a plurality of terminal devices 100, a plurality of advertiser terminals 10, a plurality of advertisement distribution servers 20, or a plurality of content distribution servers 30.

The terminal device 100 is an information processing device used by the user who browses a web page. For example, the terminal device 100 is a mobile phone, such as a smart phone, a tablet terminal, a personal digital assistant (PDA), a desktop personal computer (PC), or a notebook PC. The terminal device 100 acquires the web page C10 from the content distribution server 30 and displays the acquired web page C10, in response to the operation of the user. When the web page C10 includes an advertisement acquisition command which will be described below, the terminal device 100 acquires the advertising content items C11 to C13 from the advertisement distribution server 20 and displays the acquired advertising content items C11 to C13 together with the web page C10.

The advertiser terminal 10 is an information processing device which is used by an advertiser. For example, the advertiser terminal 10 is a desktop PC, a notebook PC, a tablet terminal, a mobile phone, or a PDA. The advertiser terminal 10 submits the advertising content items C11 to C13 to the advertisement distribution server 20 in response to the operation of the advertiser. For example, the advertiser terminal 10 submits, as the advertising content items C11 to C13, still images, moving images, text data, and a uniform resource locator (URL) for acquiring content corresponding to the advertising content item C11 to C13 to the advertisement distribution server 20.

In some cases, the advertiser requests an agency to submit advertising content. In this case, the agency transmits advertising content to the advertisement distribution server 20. Hereinafter, the concept of the term "advertiser" includes not only the advertiser but also the agency. The concept of the term "advertiser terminal" includes not only the advertiser terminal 10 but also an agency device used by the agency.

The advertisement distribution server 20 is a server device which distributes the advertising content submitted from the advertiser terminal 10. For example, when the advertisement distribution server 20 is accessed by the terminal device 100, the advertisement distribution server 20 performs advertisement matching on the basis of the position of the terminal device 100 or the attributes of the user and distributes, to the terminal device 100, advertising content which is determined be distributed on the basis of the matching result. In addition, the advertisement distribution server 20 distributes, to the terminal device 100, control information indicating the display mode of the advertising content to be distributed together with the advertising content. The control information is described by, for example, a script language, such as JavaScript (registered trademark) or Cascading Style Sheets (CSS).

The content distribution server 30 is, for example, a web server which distributes the web page C10 to the terminal device 100. For example, the content distribution server 30 distributes, to the terminal device 100, the web page C10 of a portal site including various kinds of information related to a portal site, a news site, an auction site, a weather forecast site, a shopping site, a finance (stock) site, a route search site, a map provision site, a tourism site, a restaurant introduction site, and a web blog. The content distribution server 30 may be a server which transmits, to the terminal device 100, a web page in which various kinds of information are arranged in a tile shape and information is updated for each tile.

Here, the web page C10 distributed by the content distribution server 30 includes an advertisement acquisition command. For example, the URL of the advertisement distribution server 20 is described as the advertisement acquisition command in the HTML file forming the web page C10. In this case, the terminal device 100 accesses the URL described in, for example, the HTML file to acquire advertising content items C11 to C13 from the advertisement distribution server 20.

For example, various kinds of data which are distributed from the content distribution server 30 to the terminal device 100 are actually an HTML file or an image forming a web page and a moving image which is superimposed on the web page and is then displayed. Hereinafter, in some cases, various kinds of data which are distributed from the content distribution server 30 to the terminal device 100 are referred to as content.

4. Structure of Advertisement Distribution Server

Figure 3:
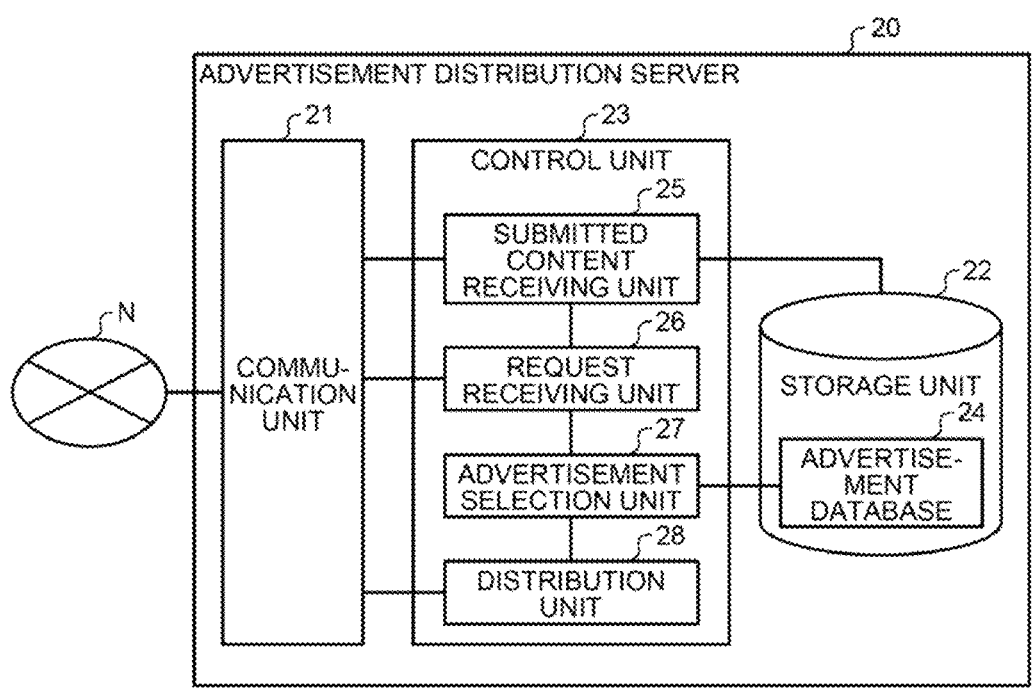
FIG. 3 is a diagram illustrating an example of the structure of an advertisement distribution server according to the embodiment.

Next, the structure of the advertisement distribution server 20 according to the embodiment will be described with reference to FIG. 3. FIG. 3 is a diagram illustrating an example of the structure of the advertisement distribution server according to the embodiment. As illustrated in FIG. 3, the advertisement distribution server 20 includes a communication unit 21, a storage unit 22, and a control unit 23.

The communication unit 21 is, for example, a network interface card (NIC). The communication unit 21 is connected to the network N wirelessly or in a wired manner and transmits and receives information to and from the terminal device 100, the advertiser terminal 10, and the content distribution server 30.

The storage unit 22 is, for example, a semiconductor memory device, such as random access memory (RAM) or flash memory, or a storage device, such as a hard disk or an optical disk. The storage unit 22 stores an advertisement database 24 in which various kinds of information related to advertising content which is submitted from the advertiser terminal 10 are stored.

Figures 4, 5:
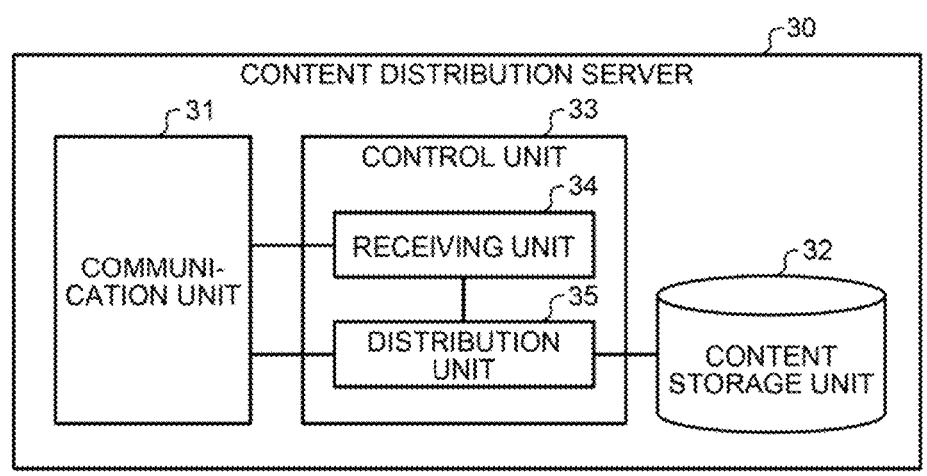
FIG. 4 is a diagram illustrating an example of information stored in an advertisement database according to the embodiment.
FIG. 5 is a diagram illustrating an example of the structure of a content distribution server according to the embodiment.

FIG. 4 is a diagram illustrating an example of the information stored in the advertisement database according to the embodiment. In the example illustrated in FIG. 4, the advertisement database 24 has items, such as an "advertiser ID", "advertising content", a "bidding price", and a "click through rate (CTR)".

The "advertiser ID" is identification information for identifying the advertiser or the advertiser terminal 10. The "advertising content" indicates advertising content which is submitted from the advertiser terminal 10. FIG. 4 illustrates an example in which conceptual information, such as "C11", "C12" or "C13", is stored as the "advertising content". However, in practice, for example, a still image, a moving image, text, data, a URL, or a file path name indicating the storage position thereof is stored.

The "bidding price" indicates an advertisement rate which is designated when the advertiser submits advertising content. For example, the "bidding price" corresponds to a unit price which is paid to the advertisement distributor (for example, the administrator of the advertisement distribution server 20 or the content distribution server 30) by the advertiser when advertising content is displayed in a web page once. For example, the "bidding price" may be the amount of money corresponding to a unit price which is paid to the advertisement distributor by the advertiser when the user selects advertising content once.

The "CTR" indicates a value obtained by dividing the number of times advertising content is clicked by the number of times advertising content is displayed. The CTR of advertising content which has not been distributed to the terminal device 100 stores, for example, a predetermined fixed value, the average value of the CTRs of all advertising content items, and the average value of the CTRs of all of the advertising content items belonging to the same advertisement category (for example, a car or travel). In addition, the "CTR" may store a predicted CTR which is predicted by, for example, a CTR prediction model. The predicted CTR is predicted by, for example, the type of advertising content or the type of web page in which advertising content is displayed.

That is, FIG. 4 illustrates an example in which an advertiser who is identified by an advertiser ID "B10" designates a bidding price "100" and submits advertising content items C11 to C13. In addition, FIG. 4 illustrates an example in which the CTR of the advertising content item "C11" is "0.02".

Here, advertising content which is displayed in the advertisement region C50 and a display instruction indicating how to display each advertising content are registered as the advertising content in the advertisement database 24. For example, in the example illustrated in FIG. 4, it is assumed that the advertising content items C11 to C13 illustrated in FIG. 1 and a display instruction to perform the advertisement change process illustrated in FIG. 1 are registered as the advertising content in the advertisement database 24. In addition, the display instruction includes various conditions which are registered by the advertiser. For example, it is assumed that the display instruction includes information, such as the positions where the advertising content items C12 and C13 are arranged, the time when the advertising content item C12 and the advertising content item C13 are switched, information for instructing the output of landing pages when the advertising content items C11 to C13 are selected, and a URL for accessing landing pages.

The description is continued with reference to FIG. 3. For example, a central processing unit (CPU) or a micro processing unit (MPU) executes various programs stored in a storage device of the advertisement distribution server 20, using RAM as a work area, to implement the functions of the control unit 23. In addition, the control unit 23 is implemented by an integrated circuit, such as an application specific integrated circuit (ASIC) or a field programmable gate array (FPGA).

As illustrated in FIG. 3, the control unit 23 includes a submitted content receiving unit 25, a request receiving unit 26, an advertisement selection unit 27, and a distribution unit 28 and implements or performs the following information processing function or operation. The internal structure of the control unit 23 is not limited to that illustrated in FIG. 3 and the control unit 23 may have any other structures as long as it can perform the following information processing. In addition, the connection relationship between the processing units provided in the control unit 23 is not limited to that illustrated in FIG. 3 and the processing units may have other connection relationship therebetween.

The submitted content receiving unit 25 receives the advertising content submitted from the advertiser terminal 10. Specifically, the submitted content receiving unit 25 receives the designated bidding price and the submitted advertising content. In addition, the submitted content receiving unit 25 receives the advertising content item C11 to C13 and the display instruction. In this case, the submitted content receiving unit 25 registers the advertising content items C11 to C13 and the display instruction in the advertisement database 24 together with the advertiser ID and the received bidding price.

The request receiving unit 26 receives an advertising content acquisition request from the terminal device 100. For example, the request receiving unit 26 receives an HTTP request as the advertising content acquisition request.

When the request receiving unit 26 receives the advertising content acquisition request, the advertisement selection unit 27 selects the advertising content to be distributed from the advertisement database 24. For example, the advertisement selection unit 27 performs the matching of the advertising content to be distributed from the advertising content items registered in the advertisement database 24, on the basis of the position of the terminal device 100 or the attributes of the user. In the matching process, advertising content having a high bidding price or a high CTR or advertising content having both a high bidding price and a high CTR may be preferentially selected. Then, the advertisement selection unit 27 outputs the advertising content which has been selected as a distribution target to the distribution unit 28.

When the web page is a search page, the advertisement selection unit 27 may use an advertisement distribution method which is called search advertising for extracting advertising content matched with a search keyword that is designated in the search page. In addition, the advertisement selection unit 27 may use an advertisement distribution method which is called targeting distribution for extracting advertising content matched with the attribute information (for example, psychographic attributes and demographic attributes) of the user.

The distribution unit 28 distributes the advertising content selected by the advertisement selection unit 27 and the control information to the terminal device 100. Specifically, when receiving the advertising content selected by the advertisement selection unit 27, the distribution unit 28 extracts the display instruction included in the received advertising content. Then, the distribution unit 28 generates control information which causes the terminal device 100 to perform the advertisement change process indicated by the extracted display instruction. Then, the distribution unit 28 distributes the generated control information and the data of an image or a moving image included in the advertising content to the terminal device 100.

5. Structure of Content Distribution Server 30

Next, the structure of the content distribution server 30 according to the embodiment will be described with reference to FIG. 5. FIG. 5 is a diagram illustrating an example of the structure of the content distribution server according to the embodiment. As illustrated in FIG. 5, the content distribution server 30 includes a communication unit 31, a content storage unit 32, and a control unit 33.

The communication unit 31 is, for example, an NIC. The communication unit 31 is connected to the network N wirelessly or in a wired manner and transmits and receives information to and from the terminal device 100 or the advertisement distribution server 20.

The content storage unit 32 is, for example, a semiconductor memory device, such as RAM or flash memory, or a storage device, such as a hard disk or an optical disk. The content storage unit 32 stores a web page which is an example of content. For example, the content storage unit 32 stores an HTML file forming a web page or a still image or a moving image displayed in a web page.

For example, a CPU or an MPU executes various programs (corresponding to an example of a distribution program) stored in a storage device of the content distribution server 30, using RAM as a work area, to implement the function of the control unit 33. In addition, the control unit 33 is implemented by an integrated circuit, such as an ASIC or an FPGA.

As illustrated in FIG. 5, the control unit 33 includes a receiving unit 34 and a distribution unit 35 and implements or performs the following information processing function or operation. The internal structure of the control unit 33 is not limited to that illustrated in FIG. 5 and the control unit 33 may have any other structures as long as it can perform the following information processing. In addition, the connection relationship between the processing units provided in the control unit 33 is not limited to that illustrated in FIG. 5 and the processing units may have other connection relationship therebetween.

The receiving unit 34 receives a web page acquisition request from the terminal device 100. For example, the receiving unit 34 receives an HTTP request as the web page acquisition request.

When the receiving unit 34 receives a web page acquisition request, the distribution unit 35 distributes a web page to the terminal device 100. Specifically, the distribution unit 35 acquires a web page corresponding to the acquisition request from the content storage unit 32 and distributes the acquired web page to the terminal device 100. In this case, when receiving the web page C10, the terminal device 100 transmits an advertisement distribution request to the advertisement distribution server 20, receives advertising content as a response, and displays the advertising content according to the advertisement change process.

6. Structure of Terminal Device

Figure 6:
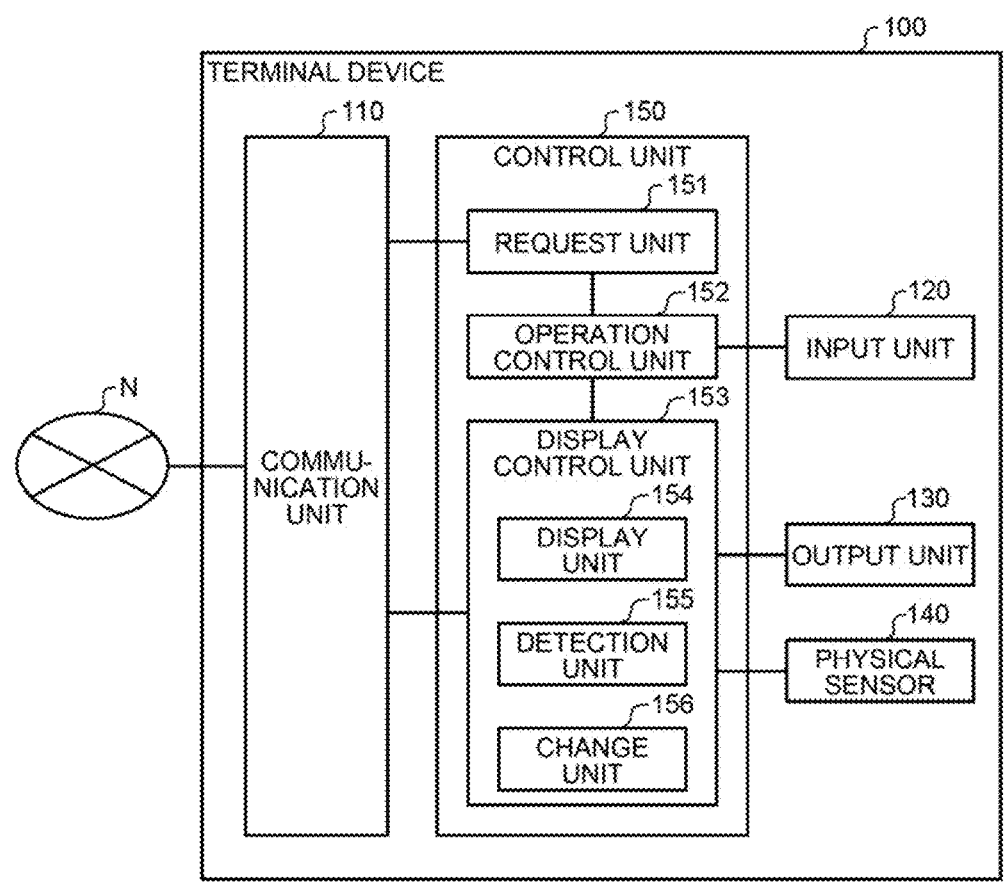
FIG. 6 is a diagram illustrating an example of the structure of a terminal device according to the embodiment.

Next, the structure of the terminal device 100 according to the embodiment will be described with reference to FIG. 6. FIG. 6 is a diagram illustrating an example of the terminal device according to the embodiment. As illustrated in FIG. 6, the terminal device 100 includes a communication unit 110, an input unit 120, an output unit 130, a physical sensor 140, and a control unit 150.

The communication unit 110 is, for example, an NIC. The communication unit 110 is connected to the network N wirelessly or in a wired manner and transmits and receives information to and from the advertisement distribution server 20 or the content distribution server 30.

The input unit 120 is an input device that receives various operations from the user. For example, the input unit 120 is, for example, a keyboard, a mouse, or an operation key. The output unit 130 is a display device for displaying various kinds of information. For example, the output unit 130 is a liquid crystal display. When a touch panel is provided in the terminal device 100, the input unit 120 and the output unit 130 are integrated with each other.

The physical sensor 140 is a sensor that detects the physical state of the terminal device 100. For example, the physical sensor 140 is a gyro sensor that measures the inclination of the terminal device 100 in three axial directions. The physical sensor 140 is not limited to a gyro sensor and may be any sensor, such as an acceleration sensor, a temperature sensor, a volume sensor, or a brightness sensor.

For example, a CPU or an MPU executes various programs (corresponding to an example of a display program) stored in a storage device of the terminal device 100, using RAM as a work area, to implement the function of the control unit 150. For example, various programs correspond to an application program which is called a web browser. In addition, the control unit 150 is implemented by an integrated circuit, such as an ASIC or an FPGA.

As illustrated in FIG. 6, the control unit 150 includes a request unit 151, an operation control unit 152, and a display control unit 153 and implements or performs the following information processing function or operation. The internal structure of the control unit 150 is not limited to that illustrated in FIG. 6 and the control unit 150 may have any other structures as long as it can perform the following information processing. In addition, the connection relationship between the processing units provided in the control unit 150 is not limited to that illustrated in FIG. 6 and the processing units may have other connection relationship therebetween.

When receiving the URL of the web page C10 from the operation control unit 152, the request unit 151 transmits an acquisition request of the web page C10 indicated by the received URL to the content distribution server 30. In addition, when an advertisement acquisition command is included in the web page received from the content distribution server 30, the request unit 151 transmits an advertising content acquisition request to the advertisement distribution server 20.

The operation control unit 152 performs various control processes on the basis of the operation of the user received through the input unit 120. For example, when the user uses the input unit 120 to perform an operation for displaying the web page C10, the operation control unit 152 outputs the URL of the web page C10 to be displayed to the request unit 151. In addition, the operation control unit 152 outputs the content of the operation of the user which has been input through the input unit 120 to the display control unit 153.

For example, when the user touches the screen with the finger F10 and moves the finger F10, the operation control unit 152 determines that a scroll operation has been performed and notifies the display control unit 153 of the moving direction of the finger F10, that is, a scroll direction, and the amount of movement of the finger, that is, the amount of scroll. In the following description, the scroll direction and the amount of scroll, are referred to as the content of a scroll operation. When an advertisement acquisition command is included in the web page C10 received by the display control unit 153, the operation control unit 152 instructs the request unit 151 to transmit an advertising content acquisition request to the advertisement distribution server 20.

The display control unit 153 performs a process of displaying the received web page and advertising content on the output unit 130. For example, the control unit 150 executes the control information which is distributed together with the advertising content to operate the display control unit 153 as a display unit 154, a detection unit 155, and a change unit 156 and to perform the advertisement change process, as illustrated in FIG. 6. For example, a CPU or an MPU executes the control information, using RAM as a work area, to implement the functions of the display unit 154, the detection unit 155, and the change unit 156.

The display unit 154 displays the web page C10 and the advertising content item C12 so as to overlap each other. Specifically, the display unit 154 arranges and displays the advertising content item C12 at a fixed position of the screen. The display unit 154 arranges and displays the web page C10 on the layer which is arranged behind the advertising content item C12. The display unit 154 arranges the advertising content item C11 which includes content related to an advertisement at a position that overlaps the advertisement region C50 included in the web page C10 on the layer in front of the advertising content item C12. Then, when receiving the content of the scroll operation from the operation control unit 152, the display unit 154 reflects the web page C10 and the advertising content item C11 in the scroll operation according to the received content of the scroll operation.

The display unit 154 performs the advertisement change process in response to an instruction from the change unit 156. For example, when receiving an instruction to change the advertising content item C12 to the advertising content item C13 from the change unit 156, the display unit 154 removes the display of the advertising content item C12 and displays the advertising content item C13 at a fixed position of the screen, similarly to the advertising content item C12. For example, when receiving an instruction to change the advertising content item C13 to the advertising content item C12 from the change unit 156, the display unit 154 removes the display of the advertising content item C13 and displays the advertising content item C12.

The display unit 154 may display the advertising content items C12 and C13 on the same layer or different layers. That is, the display unit 154 may display the advertising content items C12 and C13 on an arbitrary layer that is arranged behind the advertising content item C11 and is arranged in front of the web page C10.

The display unit 154 displays the advertising content item C13 obtained by changing the color of the advertising content item C12 in response to an instruction from the change unit 156. The display unit 154 may display, as the advertising content item C13, an icon obtained by changing the color of the advertising content item C12 in response to an instruction from the change unit 156.

The detection unit 155 detects the display position of the advertisement region C50. Then, the detection unit 155 notifies the change unit 156 of the detected position. For example, the detection unit 155 specifies the coordinates of the center (for example, an intersection point between diagonal lines) of the advertisement region C50, using the upper left corner of the web page C10 as the origin, and calculates the coordinates of the center of the advertisement region C50, using the specified coordinates and the amount of scroll of the web page C10, when the upper left corner of the screen is the origin. Then, the detection unit 155 notifies the change unit 156 of the calculated coordinates.

The change unit 156 changes the advertising content item C12 to the advertising content item C13, depending on the position where the advertisement region C50 is displayed. Specifically, the change unit 156 receives the coordinates of the center of the advertisement region C50 notified by the detection unit 155. In this case, the change unit 156 changes the advertising content item C12 to the advertising content item C13, depending on the positional relationship between the coordinates of the center of the advertising content item C12 and the coordinates of the center of the advertisement region C50. For example, when the coordinates of the center of the advertisement region C50 are located above the coordinates of the center of the advertising content item C12 on the screen by the scroll operation, the change unit 156 instructs the display unit 154 to change the advertising content item C12 to the advertising content item C13.

The change unit 156 changes the advertising content item C13 to the advertising content item C12, depending on the position where the advertisement region C50 is displayed. For example, when the coordinates of the center of the advertisement region C50 are located below the coordinates of the center of the advertising content item C12 on the screen by the scroll operation, the change unit 156 instructs the display unit 154 to change the advertising content item C13 to the advertising content item C12.

Here, the display unit 154 displays the advertising content item C11 that has a larger display size than the advertising content items C12 and C13 in the vertical direction on a layer which is arranged in front of the advertising content items C12 and C13. When the advertising content item C12 or the advertising content item C13 is hidden behind the advertising content item C11 by the scroll operation, the change unit 156 changes the advertising content item C12 and the advertising content item C13.

For example, the change unit 156 may determine whether a region that accounts for a predetermined proportion of the display region of the advertising content item C12 from a region that is located on the upper side of the screen to a region that is located on the lower side of the screen overlaps the display region of the advertising content item C11. When it is determined that the regions overlap each other, the change unit 156 may instruct the display unit 154 to change the advertising content item C12 to the advertising content item C13. The change unit 156 may determine whether a region that accounts for a predetermined proportion of the display region of the advertising content item C13 from a region that is located on the lower side of the screen to a region that is located on the upper side of the screen overlaps the display region of the advertising content item C11. When it is determined that the regions overlap each other, the change unit 156 may instruct the display unit 154 to change the advertising content item C13 to the advertising content item C12.

7. Variations in Advertisement Change Process

An example of the advertisement change process of the terminal device 100 has been described using the display mode illustrated in FIG. 1. However, the embodiment is not limited thereto. Hereinafter, variations in the advertisement change process of the terminal device 100 will be described. For example, the following advertisement change process is implemented by the control of the display unit 154 by the change unit 156.

7-1. For Advertising Content to be Switched

In the above-mentioned example, the terminal device 100 changes the advertising content item C12 to the advertising content item C13 which has the same shape as the advertising content item C12 and has a different color from the advertising content item C12. However, the embodiment is not limited thereto. For example, the terminal device 100 may change the advertising content item C12 to advertising content which has a different shape from the advertising content item C12.

Figure 7:
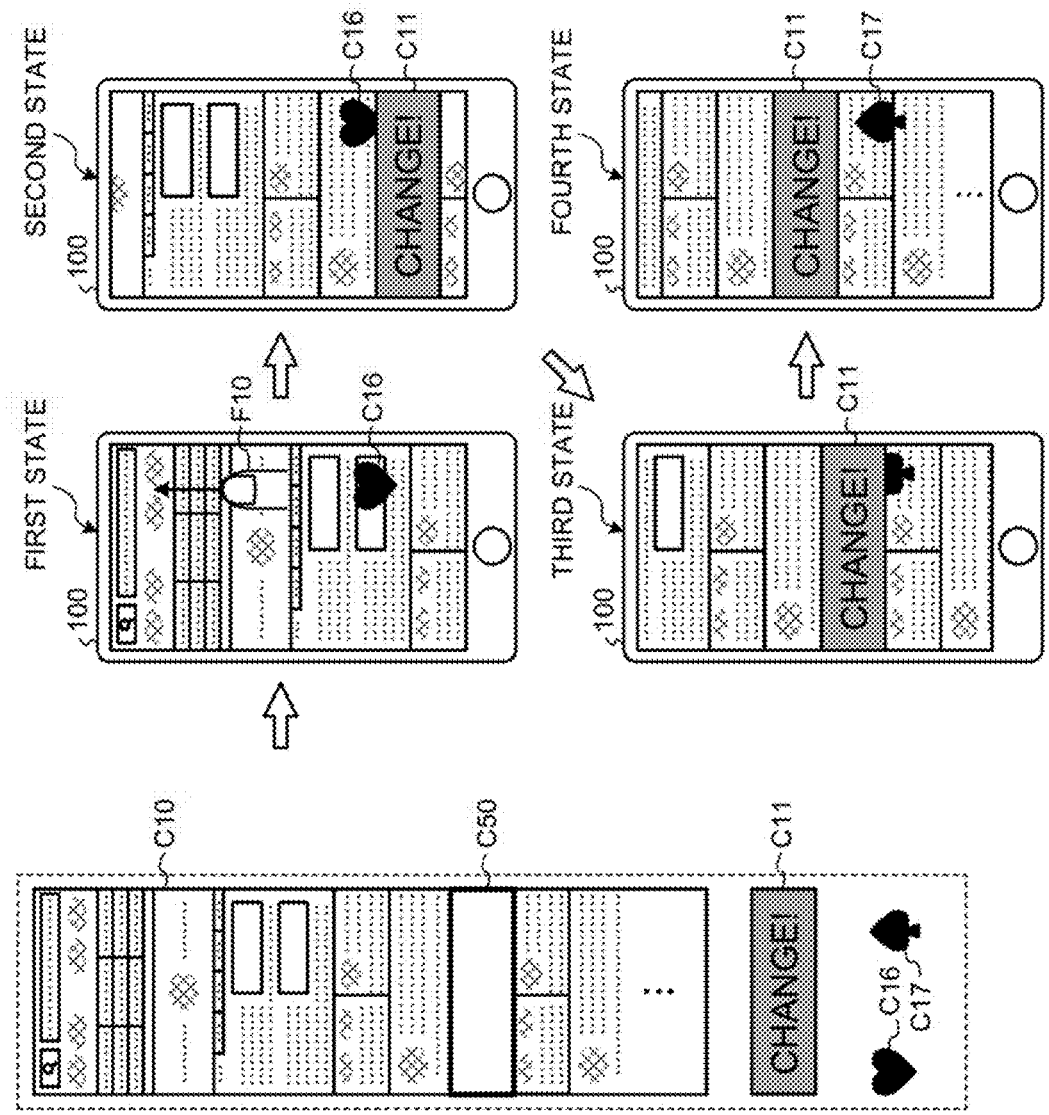
FIG. 7 is a first diagram illustrating a variation in an advertisement change process performed by the terminal device according to the embodiment.

FIG. 7 is a first diagram illustrating a variation in the advertisement change process of the terminal device according to the embodiment. For example, the terminal device 100 receives the web page C10 and advertising content items C11, C16, and C17. Here, the advertising content item C16 is an icon with a black heart shape, similarly to the advertising content item C12. The advertising content item C17 is an icon with a black spade shape. That is, the advertising content item C17 is an icon that has a different shape from the advertising content item C16. The advertising content item C17 may be an icon that has a different color from the advertising content item C16. It is assumed that the display size of the advertising content items C16 and C17 in the vertical direction is equal to or less than the display size of the advertising content item C11 in the vertical direction.

For example, as illustrated in a first state in FIG. 7, when receiving the web page C10 and the advertising content items C11, C16, and C17, the terminal device 100 displays the web page C10 on the entire screen. In addition, the terminal device 100 arranges and displays the advertising content item C16 at a fixed position of the layer which is arranged in front of the web page C10. The terminal device 100 arranges the advertising content item C11 at a position that overlaps the advertisement region C50 on a layer in front of the advertising content item C16, which is not illustrated in the first state of the FIG. 7.

When receiving a scroll operation in the upper direction, the terminal device 100 scrolls the web page C10 and the advertising content item C11 in the upper direction. The advertising content item C11 is arranged on the layer that is arranged in front of the advertising content item C16. As a result, when the display positions of the advertising content item C11 and the advertising content item C16 are overlapped by the scroll operation, the terminal device 100 displays the advertising content items C11 and C16 such that the advertising content item C16 is hidden by the advertising content item C11 from the upper side of the advertising content item C11, as illustrated in a second state in FIG. 7.

When the scroll operation is performed in the upper direction and the value of the coordinates of the center of the advertisement region C50 is equal to the value of the coordinates of the center of the advertising content item C16 in the Y-axis direction, the terminal device 100 changes the advertising content item C16 to the advertising content item C17. That is, the terminal device 100 switches the advertising content item C16 to the advertising content item C17 at the time when the advertising content item C16 is hidden by the advertising content item C11.

As a result, as illustrated in a third state in FIG. 7, when the scroll operation is further performed in the upper direction, the terminal device 100 displays the advertising content items C11 and C17 such that the advertising content item C17 emerges from the lower side of the advertising content item C11. As illustrated in a fourth state in FIG. 7, when the scroll operation is further performed in the upper direction, the terminal device 100 displays the advertising content items C11 and C17 such that the advertising content item C17 completely emerges from the rear surface of the advertising content item C11.

Similarly to the example illustrated in FIG. 1, when the scroll operation is performed in the lower direction in the third state or the fourth state illustrated in FIG. 7, the terminal device 100 displays the advertising content items C11 and C17 such that the advertising content item C17 is hidden behind the advertising content item C11 from the upper side of the advertising content item C11. Then, when the value of the coordinates of the center of the advertisement region C50 is equal to the value of the coordinates of the center of the advertising content item C17 in the Y-axis direction, the terminal device 100 changes the advertising content item C17 to the advertising content item C16. When the scroll operation is further performed in the lower direction, the terminal device 100 displays the advertising content items C11 and C16 such that the hidden advertising content item C16 emerges from the upper side of the advertising content item C11.

As such, the terminal device 100 changes the advertising content item C16 to the advertising content item C17 that has a different shape from the advertising content item C16, depending on the position where the advertisement region C50 is displayed. Therefore, the terminal device 100 can make the user aware of advertising content. As a result, it is possible to improve the effectiveness of advertising.

7-2. Variations in Advertising Content to be Switched

In the above-mentioned example, the terminal device 100 changes the advertising content, depending on the position where the advertisement region C50 is displayed. However, the embodiment is not limited thereto.

Figure 8:
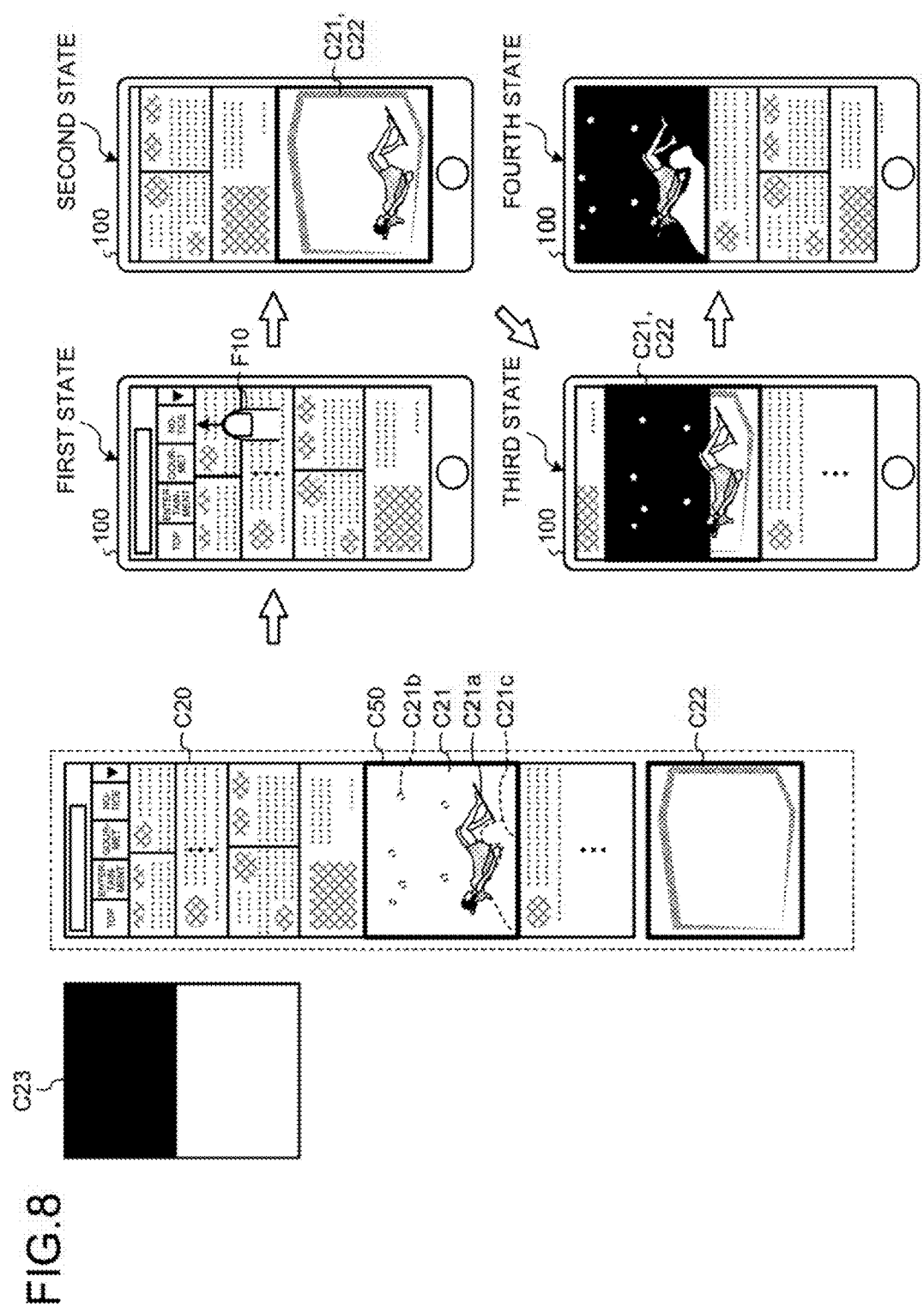
FIG. 8 is a second diagram illustrating a variation in the advertisement change process performed by the terminal device according to the embodiment.

For example, FIG. 8 is a second diagram illustrating a variation in the advertisement change process of the terminal device according to the embodiment. For example, the terminal device 100 receives a web page C20 similar to the web page C10. The web page C20 includes an advertisement region C50 that has a larger display size than the web page C10. It is assumed that various types of content which are arranged on a back layer are transparently displayed in a region in which the advertisement region C50 is arranged in the web page C20 and the other regions do not transmit various types of content which are arranged on the back layer.

The terminal device 100 receives advertising content item C21 as the second content and displays the received advertising content item C21 so as to overlap the advertisement region C50. The advertising content item C21 includes content item C21a having the shape of a person who lies, a plurality of content items C21b which are white regions surrounded by dotted lines, and content item C21c in which the shadow of the person who lies is represented in white. It is assumed that various types of content which are arranged on the back layer are transparently displayed in a region other than the regions in which the content items C21a to C21c are arranged in the advertising content item C21. In addition, it is assumed that the regions in which the content items C21a to C21c are arranged do not transmit various types of content arranged on the back layer.

The terminal device 100 further receives advertising content item C22 as the second content. The advertising content item C22 has the same size as the advertisement region C50 of the web page C20 and includes a frame-shape gray region in which predetermined transmittance is set and a region in which various types of content arranged on the background layer are transparently displayed.

The terminal device 100 generates content item C23 which is the background, on the basis of control information which is distributed together with the web page C20. Here, the content item C23 is an image which has the same display size as the screen of the terminal device 100 and in which two upper and lower regions are set. In the content item C23, the upper region is colored black and the lower region is colored white. The terminal device 100 may receive the content item C23 as one of the advertising content items together with the advertising content items C21 and C22.

When receiving the web page C20 and the advertising content items C21 and C22, the terminal device 100 performs the following process. First, the terminal device 100 arranges the advertising content items C21 and C22, which are the second content, in the advertisement region C50 included in the web page C20 which is the first content. In addition, the terminal device 100 arranges the content item C23, which is the fifth content, on a back layer which is located behind the web page C20 and the advertising content items C21 and C22.

The terminal device 100 moves the web page C20 and the advertising content items C21 and C22 in response to a scroll operation. Then, the terminal device 100 displays, as the third content, the advertising content items C21 and C22 whose display mode has been changed, depending on the region of the content item C23 arranged behind the advertisement region C50.

For example, as illustrated in a first state in FIG. 8, when receiving the web page C20 and the advertising content items C21 and C22, the terminal device 100 displays the web page C20 on the entire screen and arranges the advertising content items C21 and C22 in the advertisement region C50 of the web page C20. In addition, the terminal device 100 generates the content item C23 which is the background and arranges the content item C23 behind the web page C20. As a result, the terminal device 100 displays only the web page C20 in an initial state, as illustrated in the first state in FIG. 8.

When the user performs a scroll operation in the upper direction with the finger F10, the terminal device 100 scrolls the web page C20 and the advertising content items C21 and C22 in the upper direction. The lower region of the content item C23 is colored white. Content which is arranged on the back side is transparently displayed in a region in which the advertising content items C21a to C21c and C22 are not arranged in the advertisement region C50. Therefore, as illustrated a second state in FIG. 8, when a region of the content item C23, which is arranged behind the advertisement region C50, is colored white, the terminal device 100 displays content in the advertisement region C50 such that the advertising content item C21a and the advertising content item C22 are viewed and the advertising content items C21b and C21c are not viewed.

When a scroll operation is performed in the upper direction to further move the advertisement region C50 in the upper direction, the terminal device 100 changes the display mode of the advertising content items C21 and C22 in the advertisement region C50, as illustrated in a third state in FIG. 8. For example, the terminal device 100 changes the background to black in a region of the advertising content items C21 and C22 which overlaps the black region. As a result, the terminal device 100 displays the advertising content item C21b which has not been viewed in the second state such that the advertising content item C21b can be viewed in a region of the advertising content item C21 that overlaps the region in which the background is colored black. In addition, the terminal device 100 displays content such that a frame portion disappears in a region of the advertising content item C22, which overlaps the region in which the background is colored black, since transmittance is set in the gray frame portion.

When a scroll operation is performed in the upper direction such that the entire advertisement region C50 overlaps the black region of the content item C23, the terminal device 100 displays the advertising content items C21 and C22 whose display mode has been changed. Specifically, the terminal device 100 displays content in which the advertising content item C21a that is an icon having the shape of a person who lies, the advertising content item C21b indicating starts in the night sky, and the advertising content item C21c in which the shadow of the person who lies is colored white are drawn in the black background, as illustrated in a fourth state in FIG. 8.

As such, the terminal device 100 arranges the advertising content items C21 and C22 in the advertisement region C50 and arranges the content item C23 on the layer that is located behind the web page C20 and the advertising content items C21 and C22. Then, the terminal device 100 displays the advertising content items C21 and C22 whose display mode has been changed, according to the region of the content item C23 arranged behind the advertisement region C50. Therefore, the terminal device 100 can make the user aware of advertising content. As a result, it is possible to improve the effectiveness of advertising.

7-3. For Output of Landing Page

In the above-mentioned example, when the advertising content item C11 is selected, the terminal device 100 displays the landing page. However, the terminal device 100 may switch the landing page to be displayed, according to the above-mentioned advertisement change process.

For example, the terminal device 100 displays a first landing page when the position where the advertising content item C11 is displayed (that is, the region in which the advertisement region C50 is displayed) is below a predetermined position where the advertising content item C12 is displayed on the screen and the advertising content item C11 is selected. On the other hand, the terminal device 100 may display a second landing page when the position where the advertising content item CI is displayed is above the predetermined position where the advertising content item C12 is displayed on the screen. In addition, the terminal device 100 may display a third landing page when the advertising content items C12 are C13 are hidden by the advertising content item C11.

When the advertising content item C11 is selected, the terminal device 100 may output the landing page, on the basis of whether the advertising content item C12 is displayed on the screen, whether the advertising content item C13 is displayed, or whether each of the advertising content items C12 and C13 is displayed.

When the advertising content item C12 displayed on the screen is selected, the terminal device 100 may display a landing page related to the advertising content item C12. When the advertising content item C13 displayed on the screen is selected, the terminal device 100 may display a landing page related to the advertising content item C13. The same landing page or different landing pages may be related to the advertising content items C12 and C13.

The terminal device 100 may transmit information indicating which of the advertising content items C11 to C13 is selected or which of the advertising content items C12 and C13 is displayed to the server that distributes the landing pages to change the content to be arranged in the landing page. That is, the terminal device 100 may display a landing page having content that varies depending on which of the advertising content items C11 to C13 is selected. When the advertising content item C11 is selected, the terminal device 100 may display a landing page having content that varies depending on which of the advertising content items C12 and C13 is displayed.

7-4. For Change in Advertising Content Item C11

The terminal device 100 may change the display mode of the advertising content item C11, depending on which of the advertising content items C12 and C13 is displayed. For example, the terminal device 100 may display content in a first display mode (for example, an RGB (red, green, and blue) color model) when the advertisement region C50 is displayed below predetermined coordinates on the screen and may display content in a second display mode (for example, a grayscale mode) when the advertisement region C50 is displayed above predetermined coordinates on the screen. In addition, the terminal device 100 may change, for example, text or images arranged in the advertising content item C11 or may change the advertising content item C11 to another content item, depending on the position where the advertisement region C50 is displayed.

The terminal device 100 may change an advertisement, depending on the content of an operation performed to change the advertising content items C12 and C13. For example, when the advertisement region C50 is moved above the advertising content item C12 on the screen and the moving speed of the web page C10 by a scroll operation is less than a predetermined threshold value, the terminal device 100 displays the advertising content item C13 obtained by changing the advertising content item C12 to black. On the other hand, when the advertisement region C50 is moved above the advertising content item C12 on the screen and the moving speed of the web page C10 by the scroll operation is greater than the predetermined threshold value, the terminal device 100 may display advertising content obtained by painting the advertising content item C12 in a predetermined color. The terminal device 100 may change the advertising content item C12 to advertising content whose color changes depending on the moving speed of the web page C10. The terminal device 100 may change the advertising content item C12 to advertising content that changes depending on the moving speed of the web page C10.

7-5. Type of Content

In the above-mentioned example, the terminal device 100 displays the advertising content items C11 to C13, C21, and C22 which are images or icons. However, the embodiment is not limited thereto. For example, the terminal device 100 may display the advertising content items C11 to C13, C21, and C22 which are moving images. In this case, the terminal device 100 may stop the reproduction of the moving image when the advertising content item C11 is located below the advertising content item C12 on the screen and may reproduce the moving image when the advertising content item C11 is located above the advertising content item C12 on the screen. In addition, the terminal device 100 may control the reproduction of the moving image or the stop of the reproduction, on the basis of which of the advertising content items C12 and C13 is displayed, or may change the moving image to be reproduced, depending on which of the advertising content items C12 and C13 is displayed.

8. Flow of Process of Advertisement Distribution System

Figure 9:
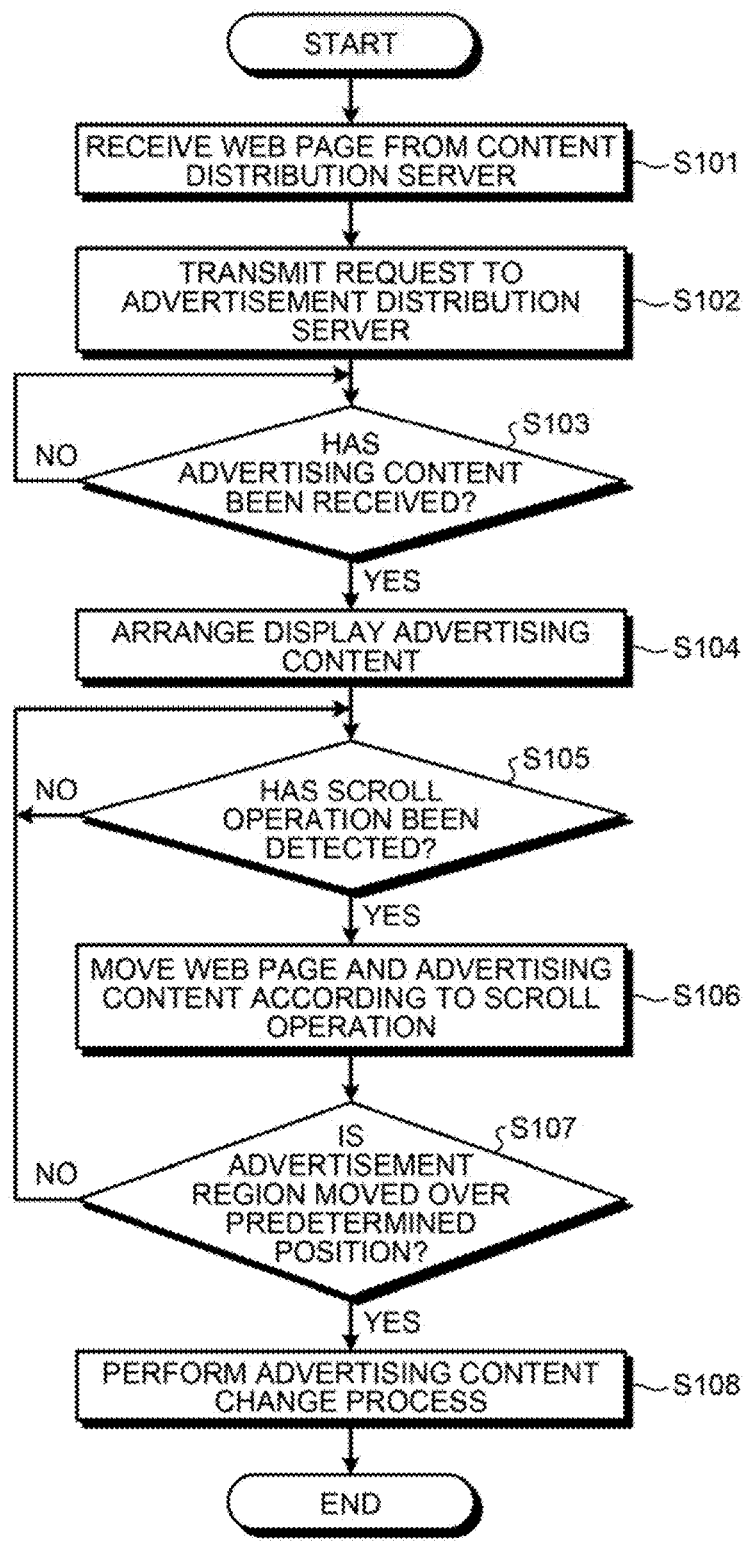
FIG. 9 is a flowchart illustrating an example of the flow of the advertisement change process performed by the terminal device according to the embodiment.

Next, the flow of the process performed by the terminal device 100 which executes the control information will be described with reference to FIG. 9. FIG. 9 is a flowchart illustrating an example of the flow of the advertisement change process performed by the terminal device according to the embodiment.

In the example illustrated in FIG. 9, the terminal device 100 requests the content distribution server 30 to distribute the web page C10 in response to the operation of the user and receives the web page C10 from the content distribution server 30 (Step S101). Then, when an advertisement acquisition command is included in the distributed web page C10, the terminal device 100 transmits a distribution request to the advertisement distribution server 20 (Step S102). Then, the terminal device 100 determines whether the advertising content items C11 to C13 have been received (Step S103). When it is determined that the advertising content items C11 to C13 have not been received (Step S103: No), the terminal device 100 performs Step 3103 again.

When it is determined that the advertising content items C11 to C13 have been received (Step S103: Yes), the terminal device 100 displays the web page C10 and arranges the advertising content item C12 in the advertisement region C50. The terminal device 100 arranges and displays the advertising content item C12 at a predetermined position (Step S104). Then, the terminal device 100 determines whether a scroll operation has been detected (Step S105). When it is determined that the scroll operation has been detected (Step S105: Yes), the terminal device 100 moves the web page C10 and the advertising content item C11 according to the scroll operation (Step S106). Then, the terminal device 100 determines whether the advertisement region C50 has been moved over a predetermined position on the screen (Step S107). For example, the terminal device 100 determines whether the center of the advertisement region C50 has been moved over a predetermined position where the center of the advertising content item C12 is arranged in the Y-axis direction of the screen.

When it is determined that the advertisement region C50 has been moved over the predetermined position on the screen (Step S107: Yes), the terminal device 100 performs the advertising content change process (Step S108). For example, when the center of the advertisement region C50 is moved above the position where the center of the advertising content item C12 is arranged, the terminal device 100 changes the advertising content item C12 to the advertising content item C13 in the Y-axis direction of the screen. When the center of the advertisement region C50 is moved below the position where the center of the advertising content item C13 is arranged, the terminal device 100 changes the advertising content item C13 to the advertising content item C12. Then, the terminal device 100 ends the process.

On the other hand, when it is determined that the scroll operation has not been detected (Step S105: No), the terminal device 100 performs Step S105 again. When it is determined that the advertisement region C50 has not been moved over the predetermined position on the screen (Step S107: No), the terminal device 100 performs Step S105 again.

9. Modifications

The advertisement distribution system 1 according to the above-described embodiment is not limited to the above-described embodiment and may be modified in various ways. Hereinafter, other embodiments of the advertisement distribution system 1 will be described.

9-1. For Advertising Content to be Changed

In the above-described embodiment, the web page C10 is an example of the first content, the advertising content item C12 is an example of the second content, and the advertising content item C13 is an example of the third content. However, the embodiment is not limited thereto. For example, in the initial state, when the advertising content item C11 is displayed above the position where the advertising content items C12 and C13 are displayed on the screen, the terminal device 100 may use the advertising content item C13 as an example of the second content and use the advertising content item C13 as an example of the second content. That is, the terminal device 100 may change the advertising content items C12 and C13, depending on the relationship between the position where the advertising content items C12 and C13 are displayed and the position where the advertising content item C11 is displayed.

9-2. For Log

The terminal device 100 may acquire the log of the advertising content which is actually displayed or the log of the advertising content which is selected by the user. For example, when the display of the web page C10 is finished by the scroll operation, without changing the advertising content items C12 and C13, the terminal device 100 acquires a log indicating that the advertising content has not been switched. When the advertising content items C12 and C13 are changed, the terminal device 100 acquires a log indicating that the advertising content items C12 and C13 have been browsed. The terminal device 100 also acquires a log indicating whether the advertising content item C11 has been displayed.

The log acquired by the terminal device 100 is useful to update the CTR of each advertising content item or to inform the advertiser of the effectiveness of advertising. In addition, the log acquired by the terminal device 100 may be used to change the content arranged in the landing page. For example, when the user selects the advertising content item C11, the terminal device 100 acquires the same landing page and notifies the server which distributes the landing page of information indicating whether the advertising content item C12 is displayed or the advertising content item C13 is displayed. At that time, the server which distributes the landing page may select content to be arranged in the landing page, on the basis of whether the advertising content item C12 is displayed or the advertising content item C13 is displayed, and distribute the landing page having the selected content arranged therein to the terminal device 100.

The terminal device 100 may change the advertising content item C12 or the advertising content item C13 to be displayed in the initial state in which the advertising content items C11 to C13 are received, depending on the log. For example, when the number of times the advertising content item C13 is displayed is greater than the number of times the advertising content item C12 is displayed, the terminal device 100 may display the advertising content item C13 in the first state illustrated in FIG. 1 and change the advertising content item C13 to the advertising content item C12, depending on the position of the advertisement region C50. In addition, the terminal device 100 may change the advertising content displayed in the initial state, depending on the difference (that is, the number of advertisements in stock) between the number of times the advertising content item C12 and the advertising content item C13 are displayed and the minimum number of times the advertising content item C12 and the advertising content item C13 are displayed.

The terminal device 100 may output the landing pages on the basis of the CTRs of the landing pages corresponding to the advertising content items C11 to C13. For example, in a case in which the number of times the landing page is displayed when the advertising content item C12 is selected is greater than the number of times the landing page is displayed when the advertising content item C11 is selected, when the advertising content item C11 is selected, the terminal device 100 may display the landing page corresponding to the advertising content item C12.

9-3. For Control Information

The terminal device 100 performs the above-mentioned display process, using the control information which is distributed together with the advertising content by the advertisement distribution server 20. However, the embodiment is not limited thereto. For example, the terminal device 100 may receive the control information together with the web page from the content distribution server 30 and receive a display instruction together with advertising content from the advertisement distribution server 20. Then, the terminal device 100 may execute the control information received from the content distribution server 30 and change the display mode of the advertising content in response to the received display instruction.

The terminal device 100 may download in advance an application which causes the terminal device 100 to perform the process of displaying the web page C10 and the above-mentioned advertisement change process and execute the application to implement the above-mentioned processes.

9-4. Structure of Device

In the above-described embodiment, the advertisement distribution system 1 includes the advertisement distribution server 20 and the content distribution server 30. The advertisement distribution server 20 and the content distribution server 30 may be integrated into one device. In this case, the advertisement distribution server 20 illustrated in FIG. 3 includes, for example, the content storage unit 32, the receiving unit 34, and the distribution unit 35 illustrated in FIG. 5. When receiving a web page acquisition request from the terminal device 100, the advertisement distribution server 20 distributes advertising content and a web page without an advertisement acquisition command to the terminal device 100.

In the above-described embodiment, advertising content is distributed from the advertisement distribution server 20 to the terminal device 100. However, the content distribution server 30 may acquire advertising content from the advertisement distribution server 20. In this case, the request receiving unit 26 of the advertisement distribution server 20 receives an advertising content acquisition request from the content distribution server 30. The advertisement distribution server 20 distributes advertising content to the content distribution server 30. The content distribution server 30 distributes the advertising content acquired from the advertisement distribution server 20 and a web page without an advertisement acquisition command to the terminal device 100.

9-5. Recording of Operation of Terminal Device

The terminal device 100 may transmit, to the advertisement distribution server 20, a record of the operation of the terminal device 100 for the web page, in which the advertising content according to the embodiment is arranged, by the user. Specifically, the terminal device 100 records, for example, the scroll operation of the user for the web page in which advertising content is arranged.

In addition, the terminal device 100 may record various operations of the user for the terminal device 100, such as a tapping operation for advertising content (that is, a selection operation), the number of times a web page is reloaded, and an operation of transmitting information for specifying advertising content from the terminal device (for example, an operation of writing data to an SNS). Then, the terminal device 100 transmits information about an operation history to the advertisement distribution server 20.

In this case, the advertisement distribution server 20 collects the information about the operation history transmitted from the terminal device 100 and further acquires the analysis information of the collected information. For example, the advertisement distribution server 20 acquires the number of scroll operations and information indicating the result of the comparison between the indexes of the effectiveness of advertising, such as the CTRs of the advertising content items C11 to C13, for advertising content involving the control information according to the embodiment and advertising content without involving the control information.

An operation history for the web page in which the advertising content involving the control information according to the embodiment is displayed is an index indicating the effectiveness of advertising. That is, in the web page in which the advertising content involving the control information according to the embodiment is displayed, not only the display of the web page, which is the destination of the advertising content, by the click operation of the user for the advertising content but also the operation history, such as the amount of scroll of the web page by the user (that is, the degree of change in advertising content by the user) are indexes indicating the interest of the user in the advertising content.

For example, the advertisement distribution server 20 can compare, for example, the number of times the user performs the scroll operation, the amount of scroll, the time when the scroll operation is performed, and information indicating whether advertising content is selected after the scroll operation is performed to provide an index indicating the degree of interest of the user in an advertisement when the advertising content involving the control information according to the embodiment is displayed. Therefore, the advertisement distribution server 20 can transmit information about the operation history of the terminal device 100 to the advertiser terminal 10 and use the information as a report indicating the index of the effectiveness of advertising for the web page in which the advertising content according to the embodiment is displayed. The advertisement distribution server 20 may transmit the information about the operation history of the terminal device 100 to the advertiser terminal 10 without any change.

In this way, the advertisement distribution server 20 shows the usability of the display mode of the advertising content involving the control information according to the embodiment in the terminal device 100 to the advertiser.

9-6. Others

Among the processes according to the above-described embodiment, some or all of the processes which are automatically performed may be manually performed, or some or all of the processes which are manually performed may be automatically performed by a known method. In addition, information including the flow of the processes, the detailed names, various kinds of data and parameters described in the specification and the drawings can be arbitrarily changed except that it is specified. For example, various kinds of information described in each of the drawings are not limited to the illustrated information.

The functional concept of each component of each device is illustrated in the drawings and each component does not necessarily have the physical structure illustrated in the drawings. That is, the detailed form of the distribution and integration of the above-mentioned device is not limited to that illustrated in the drawings and some or all of the devices may be functionally or physically distributed or integrated in an arbitrary unit according to, for example, various types of load or usage conditions. For example, the request unit 151 and the operation control unit 152 illustrated in FIG. 6 may be integrated with each other.

The above-described embodiments can be appropriately combined with each other in a range in which the content of processing is consistently maintained.

9-7. Program

Figure 10:
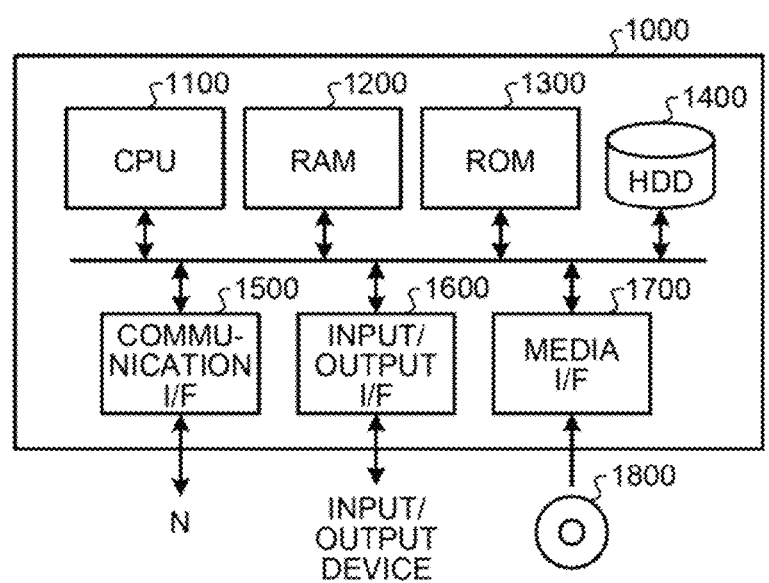
FIG. 10 is a diagram illustrating an example of the hardware configuration of a computer that implements the functions of the advertisement distribution server.

The terminal device 100, the advertisement distribution server 20, and the content distribution server 30 according to the above-described embodiments are implemented by, for example, a computer 1000 having the structure illustrated in FIG. 10. Next, description will be made using the advertisement distribution server 20 as an example. FIG. 10 is a diagram illustrating an example of the hardware configuration of a computer which implements the functions of the advertisement distribution server. The computer 1000 includes a CPU 1100, RAM 1200, ROM 1300, an HDD 1400, a communication interface (I/F) 1500, an input/output interface (I/F) 1600, and a media interface (I/F) 1700.

The CPU 1100 operates on the basis of a program stored in the ROM 1300 or the HDD 1400 and controls each unit. The ROM 1300 stores, for example, a boot program which is executed by the CPU 1100 during the start-up of the computer 1000 or a program which depends on the hardware of the computer 1000.

The HDD 1400 stores, for example, a program which is executed by the CPU 1100 and data which is used by the program. The communication interface 1500 receives data from other devices through the network N, transmits the data to the CPU 1100, and transmits data generated by the CPU 1100 to other devices.

The CPU 1100 controls an output device, such as a display or a printer, and an input device, such as a keyboard or a mouse, through the input/output interface 1600. The CPU 1100 acquires data from the input device through the input/output interface 1600. In addition, the CPU 1100 outputs the generated data to the output device through the input/output interface 1600.

The media interface 1700 reads a program, such as an information display program, or data stored in a recording medium 1800, which is an example of a non-transitory computer readable storage medium, and provides the program or the data to the CPU 1100 through the RAM 1200. The CPU 1100 loads the program from the recording medium 1800 to the RAM 1200 through the media interface 1700 and executes the loaded program. The recording medium 1800 is, for example, an optical recording medium, such as a digital versatile disc (DVD) or a phase change rewritable disk (PD), a magneto-optical recording medium, such as a magneto-optical disk (MO), a tape medium, a magnetic recording medium, or a semiconductor memory.

For example, when the computer 1000 functions as the advertisement distribution server 20 according to the embodiment, the CPU 1100 of the computer 1000 executes the program loaded to the RAM 1200 to implement the functions of the control unit 23. In addition, the HDD 1400 stores data in the storage unit 22, that is, the advertisement database 24. The CPU 1100 of the computer 1000 reads the programs from the recording medium 1800 and executes the programs. Alternatively, the CPU 1100 may acquire the programs from other devices.

When the computer 1000 functions as the terminal device 100 according to the embodiment, the CPU 1100 of the computer 1000 executes the program loaded to the RAM 1200 to implement the functions of the control unit 150.

When the computer 1000 functions as the content distribution server 30 according to the embodiment, the CPU 1100 of the computer 1000 executes the program loaded to the RAM 1200 to implement the functions of the control unit 33. In addition, the HDD 1400 stores data in the content storage unit 32.

10. Effect

As described above, the terminal device 100 displays the web page C10, which is the first content, and the advertising content item C12, which is the second content, so as to overlap each other. Then, the terminal device 100 changes the advertising content item C12 to the advertising content item C13, which is the third content, depending on the position where the advertisement region C50 is displayed. As a result, the terminal device 100 can make the user aware of the advertising content items C11 to C13 and can make the user interested in an advertisement. Therefore, it is possible to improve the effectiveness of advertising.

The terminal device 100 changes the advertising content item C12 to the advertising content item C13, depending on the positional relationship between the advertisement region C50 and the advertising content item C12. For example, the terminal device 100 changes the advertising content item C12 to the advertising content item C13 when the advertisement region C50 is moved above a predetermined position on the screen by a scroll operation. The terminal device 100 changes the advertising content item C13 to the advertising content item C12 when the advertisement region C50 is moved below a predetermined position on the screen by a scroll operation. Therefore, the terminal device 100 can switch advertising content, depending on a scroll operation. As a result, it is possible to make the user interested in an advertisement.

The terminal device 100 displays the advertising content items C12 and C13 at fixed positions of the display region.

Therefore, the terminal device 100 displays advertising content in such a way that the advertising content item C12 displayed at a predetermined position on the screen is changed to the advertising content item C13. Therefore, the terminal device 100 can change advertising content to make the user interested in an advertisement.

The terminal device 100 arranges the advertising content item C11, which is the fourth content, in the advertisement region C50 of the web page C10, arranges the advertising content item C12 on the layer behind the advertising content item C11, arranges the web page C10 on the layer behind the advertising content item C12, and displays each content item. As a result, the terminal device 100 can make the user strongly interested in an advertisement.

That is, when the advertising content item C12 is hidden behind the advertising content item C11 by the scroll operation of scrolling the web page C10 and the advertising content item C11, that is, when the region in which the advertising content item C11 is displayed is moved to the region in which the advertising content item C12 is displayed, the terminal device 100 can change the advertising content such that the advertising content item C12 is changed to the advertising content item C13. Therefore, the terminal device 100 can make the user strongly interested in an advertisement.

The terminal device 100 displays the advertising content item C11 including content related to an advertisement. For example, the terminal device 100 displays the advertising content item C11 which is a banner advertisement. Therefore, the terminal device 100 can perform display such that an icon hidden by the banner advertisement is changed. As a result, the terminal device 100 can change advertising content to make the user interested in an advertisement.

The terminal device 100 changes the advertising content item C12 to the advertising content item C13 which has the same shape as the advertising content item C12 and has a different color from the advertising content item C12. Therefore, the terminal device 100 switches the advertising content such that the color of an icon is changed by a scroll operation. As a result, the terminal device 100 can change advertising content to make the user interested in an advertisement.

The terminal device 100 changes the advertising content item C16 to the advertising content item C17 which has a different shape from the advertising content item C16. Therefore, the terminal device 100 switches the advertising content such that the shape of an icon is changed by a scroll operation. As a result, the terminal device 100 can change advertising content to make the user interested in an advertisement.

The terminal device 100 arranges the advertising content items C21 and C22, which are the second content, in the advertisement region C50 of the web page C20 and arranges the content item C23, which is the fifth content having a plurality of regions, behind the web page C20 and the advertising content items C21 and C22. Then, the terminal device 100 displays, as changed advertising content, the advertising content items C21 and C22 whose display mode has been changed, depending on the region of the content item C23 which overlaps the rear surface of the advertisement region C50. Therefore, the terminal device 100 can switch the advertising content items C21 and C22 such that the display mode of the advertising content items C21 and C22 is gradually changed, depending on a scroll operation. As a result, the terminal device 100 can make the user strongly interested in an advertisement.

The advertisement distribution server 20 distributes, to the terminal device 100, control information for controlling the display mode of the advertising content item C12 which is distributed together with the web page C10. Here, the control information causes the terminal device 100 to perform a process of displaying the web page C10 and the advertising content item C12 so as to overlap each other and changing the advertising content item C12 to the advertising content item C13, depending on the position where the advertisement region C50 is displayed. As a result, the advertisement distribution server 20 can make the user aware of the advertising content items C11 to C13 and can make the user interested in an advertisement. As a result, it is possible to improve the effectiveness of advertising.

Some embodiments of the invention have been described in detail above with reference to the drawings. However, the embodiments are illustrative. Various modifications and changes of the invention can be made on the basis of the knowledge of those skilled in the art including the aspects described in the Disclosure of the Invention.

The term "unit (section or module)" can be replaced with, for example, a "means" or a "circuit". For example, the distribution unit can be replaced with a distribution means or a distribution circuit.

According to an embodiment, it is possible to improve the advertising effect of advertising content.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information display device, which is a smart device, the information display device comprising:
   a network interface to acquire a first content corresponding to a web content, and to acquire a second content, third content, and forth content corresponding to an advertisement content;
   a touch panel display configured to detect an input from a user of the information display device; and
   a processor operatively coupled with a memory and the touch panel display, the processor being programmed to:
   display in a display region of the touch panel display:
   (i) the first content including a predetermined region,
   (ii) the second content overlapping the first content, the second content being on top of the first content in a direction perpendicular to a surface of the touch panel display at a fixed position in the display region, and (iii) the third content on top of the second content in the direction perpendicular to the surface of the touch panel display so as to overlap the predetermined region;
   determine an input operation by the user corresponding to a scroll operation;
   in response to determining the scroll operation from the user detected by the touch panel display of the information display device, scroll the first content and move the third content in the display region in accordance with the scroll operation while the second content remains at the fixed position in the display region;
   in response to the second content at the fixed position being entirely covered by the third content based on the scrolling of the first content and moving the third content to a predetermined direction, change the second content to a fourth content while the second content is entirely covered by the third content;

display the fourth content responsive to scrolling the first content and moving the third content in the predetermined direction without moving the fourth content responsive to the scroll operation;

in response to the fourth content at the fixed position being entirely covered by the third content based on the scrolling of the first content and moving the third content, change the fourth content to the second content while the fourth content is entirely covered by the third content; and display the second content responsive to scrolling the first content and moving the third content in an opposite direction as the predetermined direction without moving the second content responsive to the scroll operation.

2. The information display device according to claim 1, wherein the processor is programmed to change the second content to the third content when the predetermined region included in the first content is moved in a predetermined direction from a predetermined position included in the display region by moving the first content.

3. The information display device according to claim 2, wherein the processor is programmed to change the third content to the second content when the predetermined region included in the first content is moved in a direction opposite to the predetermined direction from the predetermined position by moving the first content.

4. The information display device according to claim 1, wherein the processor is programmed to display the second content or the third content at a fixed position included in the display region.

5. The information display device according to claim 1, wherein the processor is programmed to display the fourth content including content related to an advertisement.

6. The information display device according to claim 1, wherein the processor is programmed to change the second content to the third content, the third content having a same shape as the second content and a different color from the second content.

7. The information display device according to claim 1, wherein the processor is programmed to change the second content to the third content, the third content having a different shape from the second content.

8. The information display device according to claim 1, wherein the processor is programmed to:
arrange the second content in the predetermined region included in the first content;
arrange a fifth content having a plurality of regions behind the first content and the second content; and
change the third content to the second content based on a region of the fifth content that overlaps a rear surface of the predetermined region.

9. A distribution device comprising:
a processor programmed to distribute control information for controlling a display aspect of a second content that is displayed together with a first content to an information display device, the information display device, which is a smart device, the information display device including a network interface to acquire the first content corresponding to a web content, and to acquire the second content, a third content, and a forth content corresponding to an advertisement content, and a touch panel display configured to detect an input from a user of the information display device, the control information causing the information display device to perform a process comprising:

displaying in a display region of the touch panel display: (i) the first content including a predetermined region, (ii) the second content overlapping the first content, the second content being on top of the first content in a direction perpendicular to a surface of the touch panel display at a fixed position in the display region, and (iii) the third content on top of the second content in the direction perpendicular to the surface of the touch panel display so as to overlap the predetermined region;

determining an input operation by the user corresponding to a scroll operation;

in response to determining the scroll operation from the user detected by the touch panel display of the information display device, scrolling the first content and moving the third content in the display region in accordance with the scroll operation while the second content remains at the fixed position in the display region;

in response to the second content at the fixed position being entirely covered by the third content based on the scrolling of the first content and moving the third content to a predetermined direction, changing the second content to a fourth content while the second content is entirely covered by the third content;

displaying the fourth content responsive to scrolling the first content and the third content in the predetermined direction without moving the fourth content responsive to the scroll operation;

in response to the fourth content at the fixed position being entirely covered by the third content based on the scrolling of the first content and moving the third content, changing the fourth content to the second content while the fourth content is entirely covered by the third content; and displaying the second content responsive to scrolling the first content and moving the third content in an opposite direction as the predetermined direction without moving the second content responsive to the scroll operation.

10. An information display method that is performed by an information display device, the information display device, which is a smart device, including a network interface to acquire a first content corresponding to a web content, and to acquire a second content, third content, and forth content corresponding to an advertisement content, and a touch panel display configured to detect an input from a user of the information display device, the information display method comprising:

displaying in a display region of the touch panel display: (i) the first content including a predetermined region, (ii) the second content overlapping the first content, the second content being on top of the first content in a direction perpendicular to a surface of the touch panel display at a fixed position in the display region, and (iii) the third content on top of the second content in the direction perpendicular to the surface of the touch panel display so as to overlap the predetermined region;

determining an input operation by the user corresponding to a scroll operation;

in response to determining the scroll operation from the user detected by the touch panel display of the information display device, scrolling the first content and moving the third content in the display region in accordance with the scroll operation while the second content remains at the fixed position in the display region;

in response to the second content at the fixed position being entirely covered by the third content based on the scrolling of the first content and moving the third content to a predetermined direction, changing the second content to a fourth content while the second content is entirely covered by the third content;

displaying the fourth content responsive to scrolling the first content and moving the third content in the predetermined direction without moving the fourth content responsive to the scroll operation;

in response to the fourth content at the fixed position being entirely covered by the third content based on the scrolling of the first content and moving the third content, changing the fourth content to the second content while the fourth content is entirely covered by the third content; and displaying the second content responsive to scrolling the first content and moving the third content in an opposite direction as the predetermined direction without moving the second content responsive to the scroll operation.

11. A non-transitory computer readable storage medium having stored therein an information display program causing a computer to perform:

displaying in a display region of a touch panel display: (i) a first content including a predetermined region, (ii) a second content overlapping the first content, the second content being on top of the first content in a direction perpendicular to a surface of the touch panel display at a fixed position in the display region, and (iii) a third content on top of the second content in the direction perpendicular to the surface of the touch panel display so as to overlap the predetermined region;

determining an input operation by the user corresponding to a scroll operation;

in response to determining the scroll operation from the user detected by the touch panel display, scrolling the first content and moving the third content in the display region in accordance with the scroll operation while the second content remains at the fixed position in the display region;

in response to the second content at the fixed position being entirely covered by the third content based on the scrolling of the first content and moving the third content to a predetermined direction, changing the second content to a fourth content while the second content is entirely covered by the third content;

displaying the fourth content responsive to scrolling the first content and moving the third content in the predetermined direction without moving the fourth content responsive to the scroll operation;

in response to the fourth content at the fixed position being entirely covered by the third content based on the scrolling of the first content and moving the third content, changing the fourth content to the second content while the fourth content is entirely covered by the third content; and displaying the second content responsive to scrolling the first content and moving the third content in an opposite direction as the predetermined direction without moving the second content responsive to the scroll operation.

* * * * *